(12) United States Patent
Popovic et al.

(10) Patent No.: US 10,514,509 B2
(45) Date of Patent: Dec. 24, 2019

(54) METHOD AND APPARATUS FOR OPTICAL WAVEGUIDE-TO-SEMICONDUCTOR COUPLING AND OPTICAL VIAS FOR MONOLITHICALLY INTEGRATED ELECTRONIC AND PHOTONIC CIRCUITS

(71) Applicants: The Regents of the University of Colorado, Denver, CO (US); Massachusetts Institute of Technology, Cambridge, MA (US)

(72) Inventors: Milos Popovic, Boulder, CO (US); Vladimir Marko Stojanovic, Berkeley, CA (US); Jason Scott Orcutt, Katonah, NY (US)

(73) Assignees: The Regents of the University of Colorado, a Body Corporate, Denver, CO (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/152,898

(22) Filed: Jan. 10, 2014

(65) Prior Publication Data
US 2014/0193115 A1 Jul. 10, 2014

Related U.S. Application Data

(60) Provisional application No. 61/751,187, filed on Jan. 10, 2013.

(51) Int. Cl.
*G02B 6/34* (2006.01)
*G02B 6/124* (2006.01)

(52) U.S. Cl.
CPC .............. *G02B 6/34* (2013.01); *G02B 6/124* (2013.01)

(58) Field of Classification Search
CPC .......... H01L 2223/54453; H01L 22/34; H01S 5/021; H01S 5/0216; H01S 5/0218;
(Continued)

(56) References Cited

U.S. PATENT DOCUMENTS 4,398,056 A * 8/1983 Sheng ............... H01L 31/02168
  136/258
4,419,533 A * 12/1983 Czubatyj ............... H01L 31/075
  136/249
(Continued)

FOREIGN PATENT DOCUMENTS

| CN | 102323646 A | * | 1/2012 |
| CN | 102749680 A | * | 10/2012 |
| JP | 03119778 A | * | 5/1991 |

OTHER PUBLICATIONS

The Luxtera CMOS Integrated Photonic Chip in a Molex Cable, R. Krishnamurthy, Dec. 2012, available at http://www.chipworks.com/en/technical-competitive-analysis/resources/blog/the-luxtera-cmos-integrated-photonic-chip-in-a-molex-cable/.*
(Continued)

*Primary Examiner* — Peter Radkowski
(74) *Attorney, Agent, or Firm* — Saul Ewing Arnstein & Lehr LLP; Kathryn Doyle; Brian R. Landry

(57) ABSTRACT

An optical coupler has a waveguide coupled to a grating of multiple scattering units, each scattering unit having a first scattering element formed of a shape in a polysilicon gate layer and a second scattering element formed of a shape in a body silicon layer of a metal-oxide-semiconductor (MOS) integrated circuit (IC). The couplers may be used in a system having a coupler on each of a first and second IC, infrared light being formed into a beam passing between the couplers. Vias may be interposed in third ICs between the first
(Continued)

and second ICs. The couplers may be configured with nonuniform width of scattering elements to produce Gaussian or focused beams.

23 Claims, 17 Drawing Sheets

(58) Field of Classification Search
CPC .... H01S 5/1032; H01S 5/1035; H01S 5/1042; H01S 5/1071; H01S 5/1075; H01S 5/3095; H01S 5/3211; H01S 5/34306; H01S 5/4087; G02B 6/12023; G02B 6/34; G02B 2006/121; G03F 7/70633
USPC ........... 385/37, 11, 129, 131, 14; 372/50.11; 250/237 G
See application file for complete search history.

(56) References Cited

U.S. PATENT DOCUMENTS

| | | | |
|---|---|---|---|
| 5,033,812 A * | 7/1991 | Yoshida | G02B 6/34 385/37 |
| 5,276,745 A * | 1/1994 | Revelli, Jr. | 385/14 |
| 5,315,676 A * | 5/1994 | Sunagawa | G02B 6/34 359/575 |
| 5,581,642 A * | 12/1996 | Deacon et al. | 385/15 |
| 5,657,407 A * | 8/1997 | Li et al. | 385/37 |
| 5,926,493 A * | 7/1999 | O'Brien | B82Y 20/00 372/50.11 |
| 6,819,426 B2 * | 11/2004 | Sezginer et al. | 356/401 |
| 6,850,670 B2 * | 2/2005 | Parhami et al. | 385/37 |
| 7,082,247 B1 | 7/2006 | Gunn, III et al. | |
| 7,260,293 B1 * | 8/2007 | Gunn | G02B 6/124 385/37 |
| 7,655,489 B2 * | 2/2010 | Hall | C03C 13/048 257/E21.248 |
| 8,248,617 B2 * | 8/2012 | De Groot | G03F 7/70633 356/508 |
| 8,530,811 B2 * | 9/2013 | Molnar | G01S 3/782 250/206.1 |
| 8,787,417 B2 * | 7/2014 | Baets et al. | 372/45.01 |
| 2002/0158193 A1 * | 10/2002 | Sezginer et al. | 250/237 G |
| 2003/0021513 A1 * | 1/2003 | Parhami et al. | 385/11 |
| 2003/0206681 A1 * | 11/2003 | Polonskiy et al. | 385/15 |
| 2004/0071387 A1 * | 4/2004 | Mule | G02B 6/12002 385/14 |
| 2004/0079963 A1 * | 4/2004 | Taylor | H01L 29/155 257/183 |
| 2005/0008294 A1 * | 1/2005 | Park | G02B 6/122 385/37 |
| 2005/0041922 A1 * | 2/2005 | Yao | 385/37 |
| 2005/0236033 A1 * | 10/2005 | Lawandy | B82Y 10/00 136/252 |
| 2007/0113887 A1 * | 5/2007 | Laih | H01L 31/02167 136/259 |
| 2007/0240759 A1 * | 10/2007 | Borden | H01L 31/0322 136/258 |
| 2008/0240655 A1 * | 10/2008 | Parhami et al. | 385/37 |
| 2008/0267237 A1 * | 10/2008 | Hall | C03C 13/048 372/45.01 |
| 2008/0285610 A1 * | 11/2008 | Hall | C03C 13/048 372/45.011 |
| 2009/0134486 A1 * | 5/2009 | Fujikata | H01L 31/1085 257/449 |
| 2009/0262362 A1 * | 10/2009 | de Groot | G03F 7/70633 356/508 |
| 2009/0266413 A1 * | 10/2009 | Mathai | H01L 31/022408 136/256 |
| 2011/0174998 A1 * | 7/2011 | Molnar | G01S 3/782 250/550 |
| 2011/0220971 A1 * | 9/2011 | Haddad | H01L 27/14623 257/228 |
| 2012/0037208 A1 * | 2/2012 | Ang | H01L 31/02168 136/246 |
| 2012/0320939 A1 * | 12/2012 | Baets et al. | 372/45.01 |

OTHER PUBLICATIONS

Vermeulen, D. "High-efficiency fiber-to-chip grating couplers realized using an advanced CMOS-compatible Silicon-On-Insulator Platform," Optics Express, V. 18, No. 17, 2010, p. 18278.*
Fan et al. (2007) "High Directivity, Vertical Fiber-to-Chip Coupler with Anisotropically Radiating Grating Teeth," In; The Conference on Lasers and Electro-Optics/Quantum Electronics and Laser Science Conference and Photonic Applications Systems Technologies, OSA Technical Digest Series. Paper CTuDD3. pp. 1-2.*
Flory (2004) "Analysis of Directional Grating-Coupled Radiation in Waiveguide Structures," IEEE Journal of Quantum Electronics. 40:949-957.*
Wang et al. (2005) "Stratified Waveguide Grating Coupler for Normal Fiver Incidence," Optics Letter. 30:845-847.*
Yao et al. (2011) "Grating-Coupler-Based Optical Proximity Coupling for Scalable Computing Systems," Proceedings ofSPIE. 794405:1-7.*
Mekis et al., "A Grating-Coupler-Enabled CMOS Photonics Platform," in IEEE Journal of Selected Topics in Quantum Electronics, vol. 17, No. 3, pp. 597-608, May-Jun. 2011. doi: 10.1109/JSTQE.2010.2086049.*
Taillaert et al., "Compact efficient broadband grating coupler for silicon-on-insulator waveguides," Opt. Lett. 29, 2749-2751 (2004).*
Bolten et al. CMOS compatible cost-efficient fabrication of SOI grating couplers, Microelectronic Engineering, vol. 86, Issues 4-6, Apr.-Jun. 2009, pp. 1114-1116, ISSN 0167-9317, http://dx.doi.org/10.1016/j.mee.2008.11.038. (http://www.sciencedirect.com/science/article/pii/S0167931708005431).*
Tang et al. "Highly efficient nonuniform grating coupler for silicon-on-insulator nanophotonic circuits," Opt. Lett., vol. 35, No. 8, pp. 1290-1292, 2010.*
Yang et al. "High-performance and compact binary blazed grating coupler based on an asymmetric subgrating structure and vertical coupling," Opt. Lett. 36, 2614-2617 (2011).*
Qiu et al., "Novel silicon-on-insulator grating couplers based on CMOS poly-silicon gate layer," Communications and Photonics Conference and Exhibition, 2011. ACP. Asia, Shanghai, 2011, pp. 1-6. doi: 10.1117/12.904183.*
Wirth, Justin, "Silicon Grating Couplers for Low Loss Coupling between Optical Fiber and Silicon Nanowires," Thesis, Purdue University, 2011, available at https://engineering.purdue.edu/~fsoptics/thesis/Wirth__Justin_MS.pdf.*
SPIE Proceedings Publication Timeline/Guidelines; http://spie.org/publications/conference-proceedings ("The original research papers presented at SPIE conferences are available 2 to 4 weeks after the conferences in the SPIE Digital Library."). http://spiedigitallibrary.org/.*
Fan et al., High Directivity, Vertical Fiber-to-Chip Coupler with Anisotropically Radiating Grating Teeth, In; The Conference on Lasers and Electro-Optics/Quantum Electronics and Laser Science Conference and Photonic Applications Systems Technologies, OSA Technical Digest Series. 2007. Paper CTuDD3. pp. 1-2.*
Soljacic et al. (Presentation—"Unidirecctional backscattering-immune topological electromagnetic states (one-way-states)" at SIAM, 2010; "Soljacic").*
Michael A. Steindorfer, Volker Schmidt, Maria Belegratis, Barbara Stadlober, and Joachim R. Krenn, "Detailed simulation of structural color generation inspired by the Morpho butterfly," Opt. Express 20, 21485-21494 (2012).*
Bock et al., Demultiplexer with blazed waveguide sidewall grating and sub-wavelength grating structure, Optics Express, V. 16, N. 22, 2008.*
Bock et al., Demonstration of a curved sidewall grating demultiplexer on silicon, Optics Express, V. 20, N. 18, 2012.*

(56) References Cited

OTHER PUBLICATIONS

C. A. Flory, "Analysis of directional grating-coupled radiation in waveguide structures," in IEEE Journal of Quantum Electronics, vol. 40, No. 7, pp. 949-957, Jul. 2004.*

Chen et al. (Aug. 1, 2010) "Apodized Waveguide Grating Couplers for Efficient Coupling to Optical Fibers," *IEEE Photonics Technology Letters*. 22:1156-1158.

Gunn (2006) "CMOS Photonics High-Speed Interconnects," *IEEE Micro*. 26:58-66.

Huang et al. (2006) Á 10Gb/s Photonic Modulator and WDM MUX/DEMUX Integrated with Electronics in 0.13μm SOI CMOS, In; *The 2006 IEEE International Solid-Sate Circuits Conference: Digest of Technical Papers*. Optical Communication 13.7 pp. 24-25.

Miller et al. (1980) "Chirped and Curved Grating Coupler Focusing Both Outgoing Beam and Guided Wave," *Optics Communications*. 33:13-16.

Orcutt et al. (Jan. 31, 2011) "Nanophotonic Integration in State-of-the-Art CMOS Foundries," 19:2335-2346.

Orcutt et al. (May 21, 2012) "Open Foundry Platform for High-Performance Electronic-Photonic Integration," *Optics Express*. 20:12222-12232.

Orobtchouk et al. (2000) "High-Efficiency Light Coupling in a Submicrometric Silicon-on-Insulator Waveguide," *Applied Optics*. 39:5773-5777.

Peng et al. (2004) "Input-Grating Couplers for Narrow Gaussian Beam: Influence of Beam Depth," *Optics Express*. 12:6481-6490.

Roelkens et al. (2006) "High-Efficiency Silicon-on-Insulator Grating Coupler Based on a Poly-Silicon Overlay," *Optics Express*. 14:11622-11630.

Schmid et al. (2009) "Optimized Grating Coupler with Fully Etched Slots," *Optics Express*. 17:11066-11076.

Sohn et al. (2004) "Focusing Grating Coupler for Blue Laser Light," *IEEE Photonics Technology Letters*. 16:162-164.

Taillaert et al. (2002) "An Out-of-Plane Grating Coupler for Efficient Butt-Coupling Between Compact Planar Waveguides and Single-Mode Fibers," *IEEE Journal of Quantum Electronics*. 38:949-955.

Taillaert et al. (2004) "Compact Efficient Broadband Grating Coupler for Silicon-on-Insulator Waveguides," *Optics Letters*. 29:2749-2751.

Ura et al. (1988) "Focusing Grating Couplers for Polarization Detection," *Journal of Lightwave Technology*. 6:1028-1033.

Van Laere et al. "Compact Grating Couplers Between Optical Fibers and Silicon-on-Insulator Photonic Waveguides with 69% Coupling Efficiency," In; *The IEEE 2006 Optical Fiber Communication Conference and the 2006 National Fiber Optic Engineers Conference*. pp. 1-3.

Westerveld et al. (May 2011) "Optimized 3-D Simulation Method for Modeling Out-of-Plane Radiation in Silicon Photonic Integrated Circuits," *IEEE Journal of Quantum Electronics*. 47:561-568.

Bock, Przemek J. et al.,"Demonstration of a curved sidewall grating demultiplexer on silicon", *Optics Express* 19882, vol. 20, No. 18, Aug. 27, 2012,11 pages.

Bock, Przemek J. et al.,"Demultiplexer with blazed waveguide sidewall grating and sub-wavelength grating structure", *Optics Express* 17616, vol. 16, No. 22, Oct. 27, 2008, 10 pages.

Chen, Huai-Yi et al.,"Design of a high-efficiency grating coupler based on a silicon nitride overlay for silicon-on-insulator waveguides", *Applied Optics*, vol. 49, No. 33, Nov. 20, 2010, pp. 6455-6462.

Flory, Curt A. et al.,"Analysis of Directional Grating-Coupled Radiation in Waveguide Structures", CiteSeer, In Proc. IEEE Journal of Quantum Electronics, 2004, 29 pages.

Steindorfer, Michael A. et al.,"Detailed simulation of structural color generation inspired by the Morpho butterfly", *Optics Express* 21485, vol. 20, No. 19, Sep. 10, 2012, 10 pages.

Vermeulen, D. et al.,"High-efficiency fiber-to-chip grating couplers realized using an advanced CMOS-compatible Silicon-On-Insulator platform", *Optics Express* 18278, vol. 18, No. 17, Aug. 16, 2010, 6 pages.

Haldane, et al., Possible Realization of Directional Optical Waveguides in Photonic Crystals with Broken Time-Reversal Symmetry, Phys. Rev. Lett. 100, 2008, 013904.

Lecamp, B. et al., 'Theoretical and computational concepts for periodic optical waveguides, Optics Express 11042, vol. 15, No. 18, Sep. 3, 2007, 19 pp.

* cited by examiner

Die hops:   0        1           2              3                 4

METHOD AND APPARATUS FOR OPTICAL WAVEGUIDE-TO-SEMICONDUCTOR COUPLING AND OPTICAL VIAS FOR MONOLITHICALLY INTEGRATED ELECTRONIC AND PHOTONIC CIRCUITS

RELATED APPLICATIONS AND CLAIM TO PRIORITY

This application claims priority from U.S. Provisional Patent Application 61/751,187 filed 10 Jan. 2013, the entire contents of which is hereby incorporated herein by reference.

GOVERNMENT INTEREST

This invention was made with government support under grant number HR0011-11-C-0100 awarded by DOD/DARPA, and Grant number ECCS1128709 awarded by National Science Foundation. The government has certain rights in the invention.

TECHNICAL FIELD

The present document relates to the field of integrated circuits having integrated optical devices and, in many embodiments, electronic devices on the same die. In particular embodiments, the integrated optical devices include optical waveguides and other optical components on a same die as CMOS circuitry.

BACKGROUND

There are many applications, including cameras, optical data transmitters, and optical data receivers, where electronic circuitry and optical devices are combined on a single integrated circuit.

It is also widely known that a significant limitation of modern processors and system-on-a-chip design is data transfer between functional units on a very large-scale integrated (VLSI) circuit; where resistance and capacitance of interconnect may significantly limit data rates.—An electro-optical interconnect may help solve this limitation on data rates. Further, many VLSI-based system designs suffer limitations on data rate due to the resistance of bondpad drivers and capacitance of chip-to-chip interconnect; electro-optical interconnects may prove a solution to this problem also. Furthermore, the energy per bit of electronic interconnects may place a power (thermal) budget limitation on the operation of an electronic microchip. Electro-optical interconnects may enable lower energy per bit interconnects. Finally, electrical interconnects may incur electrical crosstalk between adjacent wire lines that limits the spatial bandwidth density of interconnection to/from a chip. Optical interconnects may employ dense wavelength division multiplexing (DWDM) to achieve orders of magnitude higher bandwidth density without incurring significant cross-talk penalties. If on-chip optical interconnect is to become commonplace within large VLSI circuits, or inter-chip optical interconnect common within systems embodying multiple VLSI circuits, it is desirable to have efficient ways of coupling light into or out of the circuits, and to be able to route light from one part of a circuit to another.

Integrated photonics, including silicon photonics, has potential to enable electronic-photonic circuits with advanced optical signal processing functions and capabilities. One important area of application is energy-efficient photonic links for processor to memory chip communication, as well as chip-to-chip and on-chip interconnects. Other applications include active optical cables for rack-to-rack interconnects, transmitters and receivers for 100 Gbps Ethernet and beyond, as well as applications such as sensing, imaging (e.g. optical coherence tomography, etc.) and image/video projection applications, beam steering, and visible light biophotonic chips for high throughput biotechnology applications.

Integrated and silicon photonics typically employs customized fabrication processes. For silicon photonics, this typically means use of silicon-on-insulator (SOI) wafers with a large oxide thickness of 2-3 microns, and materials and/or lithography and process steps that are tailored to photonics, and not compatible with high density microelectronics.

Microelectronics, on the other hand, relies on carefully optimized complementary metal oxide semiconductor (CMOS) processes, such as those used for microprocessors and dynamic random access memory (DRAM) chips. A number of key potential applications for photonics are in state of the art CMOS logic chips including processors, and in DRAM memory chips.

Efficient optical fiber to on-chip waveguide coupling, and photonic vias for chip to chip, die to die, or layer to layer communication within a chip/die, would be desirable for commercially valuable photonic chip technology.

Furthermore, three-dimensional (3D) die stacking is a forthcoming integration technology that will result in chips comprising multiple die bonded together. An example is the Hybrid Memory Cube (HMC) (Trademark of Hybrid Memory Cube Consortium, Beaverton, Oreg.) technology for stacked memory chips. Electrical power and communication between dies in the stack may be done off-chip via wire bonding, or using through silicon vias (TSVs). For photonics to be fully enabled in such systems, efficient optical interconnection between device layers of several stacked die chips is desirable.

SUMMARY

In an embodiment, an optical coupler has a waveguide coupled to a grating of multiple scattering units, each scattering unit having a first scattering element formed of a shape in a polysilicon gate layer and a second scattering element formed of a shape in a body silicon layer of a metal-oxide-semiconductor (MOS) integrated circuit (IC).

In another embodiment, a system has a first IC with a first coupler, the first coupler comprising a first waveguide coupled to a grating with multiple scattering units, each scattering unit having a first scattering element formed of a shape in a polysilicon gate layer of the first integrated circuit and a second scattering element formed of a shape in a body silicon layer of the first integrated circuit. The system also has a second integrated circuit having a second coupler, the second coupler having a second waveguide coupled to a grating having multiple second scattering units, each second scattering unit with a first scattering element formed of a shape in a polysilicon gate layer of the second integrated circuit and a second scattering element formed of a shape in a body silicon layer of the second integrated circuit. The first optical coupler is configured to divert light from the first waveguide primarily along a light path directed to the second optical coupler.

A grating coupler has a waveguide coupled to a grating, the grating having multiple scattering units, each scattering unit having a portion of silicon having a first thickness and formed on a first layer of silicon, adjacent a second portion of silicon having a second thickness and formed on a second layer of silicon.

In yet another embodiment, an optical system has a first integrated circuit having a first coupler, the first coupler having a first waveguide coupled to a grating with multiple scattering units; and a second coupler, the second coupler having a second waveguide coupled to a grating with multiple second scattering units. The first coupler is a focusing coupler for producing a focused optical beam having a beam waist between the first and second coupler, the second coupler being aligned to receive the focused optical beam produced by the first coupler.

In yet another embodiment, an optical interlayer coupling system has a first integrated circuit with a first coupler, the first coupler including a first waveguide coupled to a first grating with multiple scattering units coupling the waveguide to a beam having a first electric field profile and a first output angle. The beam from the first coupler is aimed at a second integrated circuit having a second coupler, the second coupler having a second waveguide coupled to a second grating with multiple second scattering units and configured to receive the beam at approximately an opposite angle from the first output angle.

DETAILED DESCRIPTION OF THE EMBODIMENTS

Microelectronics relies on carefully optimized complementary metal oxide semiconductor (CMOS) processes. In this document, we will refer to a CMOS process including silicon on insulator (SOI) CMOS and bulk silicon CMOS ("bulk CMOS") variants. We will refer to SOI CMOS and bulk CMOS processes designed for microelectronics as transistor processes, in contrast to custom photonics processes that are typically tailored for photonics and do not support high performance transistors. Examples of SOI CMOS transistor processes include 45 nm SOI CMOS process supported by IBM's 12SOI (IBM, Armonk, N.Y.), as well as by GlobalFoundries (Sunnyvale, Calif.), 32 nm SOI CMOS (IBM 32SOI process), and many others in the semiconductor industry. Although silicon photonics is sometimes referred to as "CMOS compatible" in the literature, this typically refers to using silicon or CMOS compatible materials, and—not—to compatibility of devices with a standard CMOS transistor process. In this disclosure stating CMOS or SOI CMOS will—not—refer to custom photonics SOI platforms (which will be identified as custom photonics SOI), but will refer to mainstream CMOS processing.

In embodiments of the invention, efficient optical fiber-to-chip coupler designs are disclosed that are directly integrable in SOI CMOS or bulk CMOS transistor processes. In other embodiments of the invention, efficient optical vias based on optical fiber-to-chip coupler designs are disclosed that are directly integrable in either custom processes or in SOI CMOS or bulk CMOS transistor processes.

Figure 1:
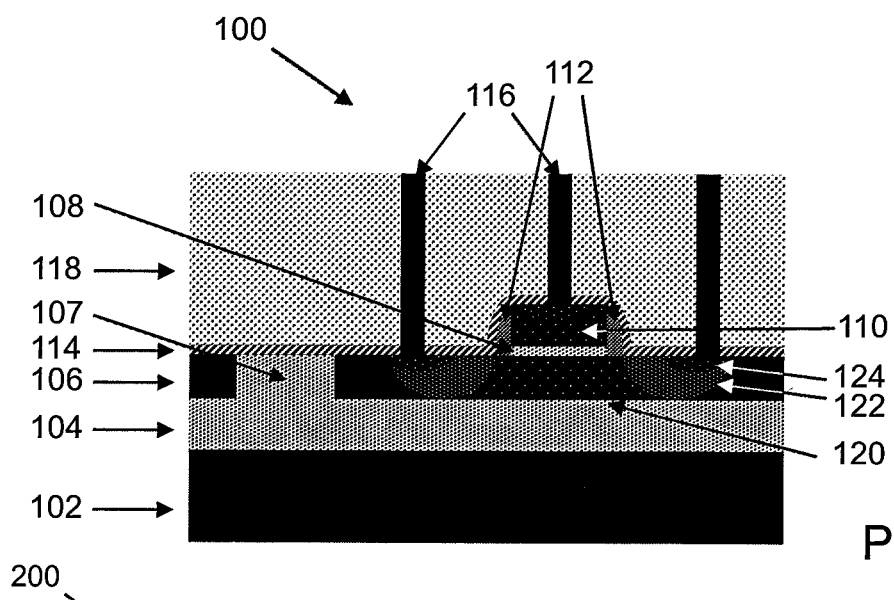
FIG. 1 is a cross section illustration of a PRIOR ART chip produced with a modern CMOS SOI fabrication process, including a MOSFET transistor cross-section.

In certain embodiments of the invention, photonic devices are disclosed that are compatible with an SOI CMOS transistor process. FIG. 1 illustrates the main material layers near the device layer of a transistor in a typical SOI CMOS transistor process. The cross-section of the transistor 100 may include the bulk silicon wafer 102, a shallow trench isolation (STI) oxide 104, a crystalline silicon transistor-body layer 106, a gate oxide layer 108, a polycrystalline silicon transistor gate layer 110, oxide spacers 112, a silicon nitride barrier/liner layer 114, metal plugs 116 leading up to the back end of line (BEOL) metal interconnect stack including metal layers and vias, and an oxide, such as silicon dioxide SiO2, or another glass, or a low-loss dielectric cover layer 118. Where an oxide fills an optical via such as those described below, the oxide may include one or more of phosphosilicate glass (PSG), borosilicate glass (BSG), various silicon oxycarbides —SiCOH, silicon dioxide SiO2, etc. The body silicon layer 106 may contain various implants such as well and threshold-voltage shifting implants 120, and source/drain implants 122; the body silicon layer is partitioned by isolation implants or oxide insulating plugs or shallow trench isolation (STI) oxide 107 to allow electrical separation of transistors from each other. The poly gate may also have implants (not shown). The implants may form mid-level or heavily doped p or n type, silicon. Low-resistance contacts of the body 106 to the metal interconnect plugs 116 is provided by a silicided region 124.

It should be noted that, while each silicon layer, such as silicon body layer 106, polysilicon gate layer 110, substrate silicon 102, is of uniform thickness over a wafer or integrated circuit, these layers typically have distinctly different thickness. Polysilicon 108 thus typically has a different thickness than body silicon layer 106.

Embodiments of the photonic device designs employ these existing high performance CMOS transistor process layers to enable photonic devices. Challenges for implementing photonic devices within an SOI CMOS process are several. The body silicon layer 106 can be patterned to form a finite width waveguide in standard SOI CMOS, with implant steps blocked to provide an undoped waveguide structure, and has been shown to support relatively low optical loss on the order of 2 to 4 dB/cm and may in general support between 0 and 10 dB/cm in at least the 1550 (about 1450 to 1650 nm) and 1280 (about 1140 to 1340 nm) nanometer infrared bands. In embodiments the coupler and waveguide have a design center wavelength of infrared light between 1100 and 1650 nanometers. The poly gate layer 110 can also be patterned into an optical waveguide. However, columnar polycrystalline silicon in that layer may result in waveguide losses on the order of 100 dB/cm even when undoped. The oxide spacers 112 and nitride liner 114 are typically integral parts of the CMOS process, and are hence also incorporated in embodiments and designs of the photonic devices.

Figure 2:
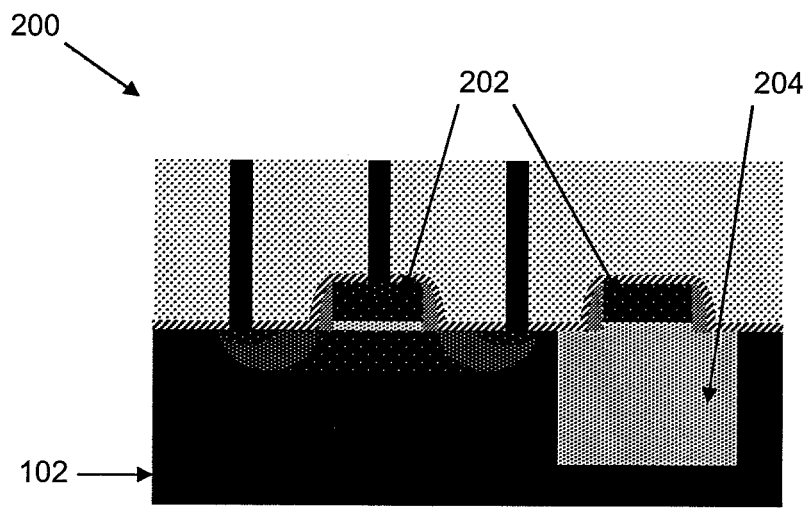
FIG. 2 is a cross section illustration of a PRIOR ART chip produced with a modern CMOS bulk fabrication process, including a MOSFET transistor cross-section.

In another set of embodiments of the invention, photonic devices are compatible with integration into a bulk CMOS transistor process. FIG. 2 illustrates the main material layers near the device layer of a transistor in a typical PRIOR ART bulk CMOS process 200. The cross-section of the bulk CMOS transistor may be similar to that of a SOI CMOS transistor 100, with the exception that there is no crystalline body device layer 106 separated from the bulk silicon substrate 102, and no STI layer 104 that serves as the barrier. The transistor body is instead typically formed in the bulk wafer 102 instead. The poly gate layer 202 may be used for optical confinement and forming waveguides in bulk CMOS. Minimal modifications to standard bulk CMOS transistor processes have been tried that enable an oxide trench (deep trench isolation, DTI) 204 beneath the poly gate layer 102 to permit optical confinement.

Since siliciding, as is sometimes but not always used to reduce series electrical resistance of gate polysilicon and source-drain body-silicon structures, can interfere with optical properties, in most embodiments siliciding of these layers is avoided in areas of integrated circuits used for the herein-described waveguides and couplers.

In embodiments, a diffractive optical structure called a grating coupler is used. While the term grating is conventionally used to mean an array of parallel or ruled lines, we use the term "grating" in a generalized sense to mean any array of equivalent or similar elements with a spacing. Each element may be a bar of material, e.g. an elongated rectangular solid, but may also have an arbitrary cross-section different from a rectangle "extruded" to be primarily invariant in one (grating coupler's transverse) linear dimension. Furthermore, curved couplers may have elements with an arbitrary cross-section that are extruded to be curved in the grating coupler's transverse dimension. The spacing of these elements may further be periodic, near periodic, or slowly varying along the grating. In general, structures that repeat elements along one dimension of various standard coordinate systems may be used, be that Cartesian, polar, elliptical, or other 2D natural coordinates.

Figure 3:
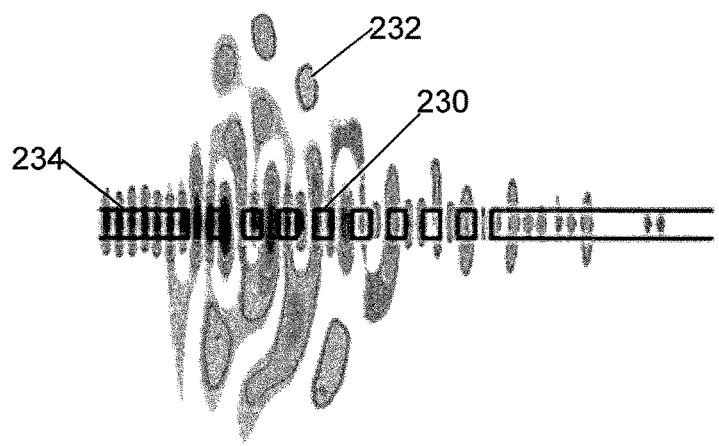
FIG. 3 is an electric field distribution pattern in the cross section of a PRIOR ART symmetrical coupler.

A PRIOR ART grating coupler is illustrated in FIG. 3. The coupler 230 couples power between a waveguide 234 and signal output beam 232 propagating in a substantially vertical direction leaving or entering waveguide 234. This prior coupler has a substantially symmetrical signal output beam electric field pattern 232, showing nearly equal radiation in the upward and downward directions. If only one receiver is placed either above, or below, but not on both sides of the coupler, then the bidirectional radiation is a source of substantial optical loss as uncollected light radiates away from the opposite side of the coupler.

Figure 3A:
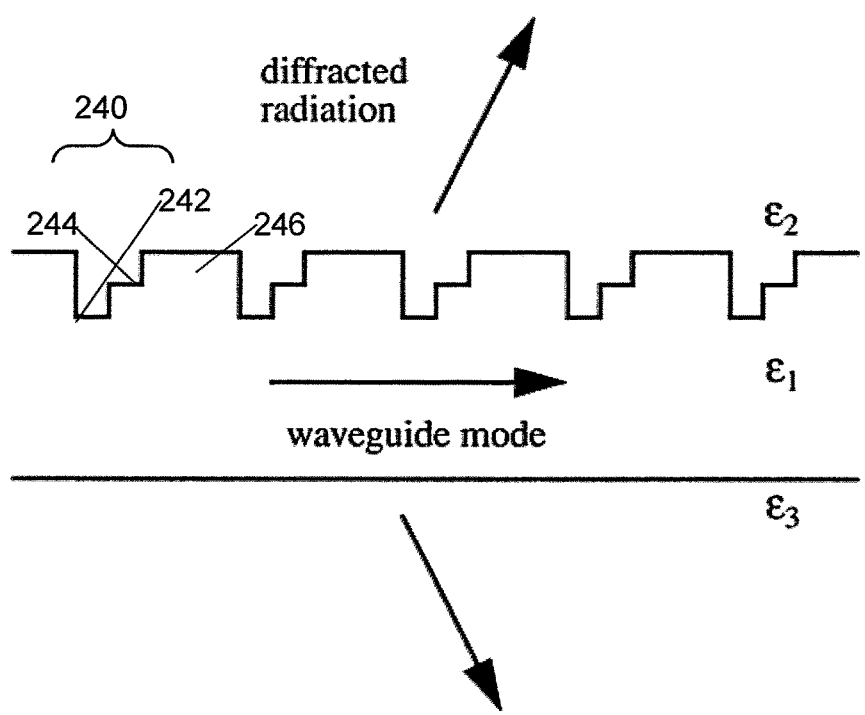
FIG. 3A is a cross sectional diagram of a PRIOR ART directional grating coupler.

A prior-art asymmetrical or directional grating coupler is illustrated in FIG. 3A. This figure is copied from FIG. 1 of C. A. Flory, Analysis of Directional Grating-Coupled Radiation in Waveguide Structures, IEEE Journal Of Quantum Electronics, Vol. 40, No. 7, July 2004. (No other figures are copied from Flory) The waveguide of Flory has $\varepsilon_2=\varepsilon_3=11.56$, and $\varepsilon_2=12.96$, such that the refractive index of core and cladding are nearly equal (corresponding to a low refractive index contrast regime of integrated optics), and uses repeating grooves 240 cut or etched to two distinct levels, 242, 244 in a core 246 of an optical waveguide, without penetrating the full thickness of the waveguide. Due to the low index contrast, the waveguide core in Flory is about 1 micron in thickness. Due to the low index contrast, scattering from each groove is small, this system falls within the range of applicability of perturbation theory (such as the volume current method, VCM) to evaluate the caused out-of-plane radiation. Because scattering per groove is small, many periods are needed to radiate all power out of the waveguide, making the beam spot large at least in the direction of propagation in the grating. Hence, low index-contrast systems may not be suitable for exciting small beams of a few microns or tens of microns in diameter, especially as suitable for coupling to standard 10 micron-diameter core telecom optical fiber, or small core (e.g. 5 micron diameter) fibers, or for short-hop optical vias of optimal design, which call for small diameter beams as discussed later in the disclosure.

Basic Devices

Most devices herein described are, in a silicon embodiment, designed for a center wavelength of 1550 nanometers, 1280 nm, or 1180 nm, for use with silicon semiconductor material; by appropriate changes to line pitches, widths, and spacings, the devices may be designed for other wavelengths as appropriate for integrated photodiodes, lasers, or light emitting diodes fabricated in the semiconductor material used, or in general other optical wavelength ranges employed on chip, with external light sources. It is anticipated that semiconductor materials other than silicon, such as gallium arsenide, germanium, germanium on silicon, silicon carbide, diamond, or other materials may be used in place of silicon; as well as dielectrics such as silicon nitride, silicon oxynitride ($SiO_xN_y$), silicon oxycarbides (SiCOH), chalcogenide glasses, and various oxides, nitrides and polymers. In general, any material with a sufficiently high refractive index contrast relative to the cladding refractive index to support strong scattering may be used to realize coupler designs according to the disclosed concepts. The devices may be useful over an operating wavelength range (OWR) of 20-40 nm around the center wavelength, and in some embodiments 60-100 nm or more. Unless otherwise stated, we define the operating wavelength range to be the wavelength range over which the coupling efficiency is at least half of its peak value; this is also referred to as the 3 dB bandwidth. In some examples, other definitions are used, e.g. the 1 dB bandwidth, and in those cases this is explicitly stated.

Designs herein described have been verified using simulations using a two-dimensional finite-difference time-domain (2D FDTD) method, with the third dimension accounted for by an effective index method. The 2D FDTD simulations and effective index method approach were compared to full 3D FDTD simulations, which are much more time consuming, in a few instances and were verified to correspond very closely. All given coupling efficiencies grating (chip)-to-fiber are relative to total input power Pin in the grating from the source.

Figure 4:
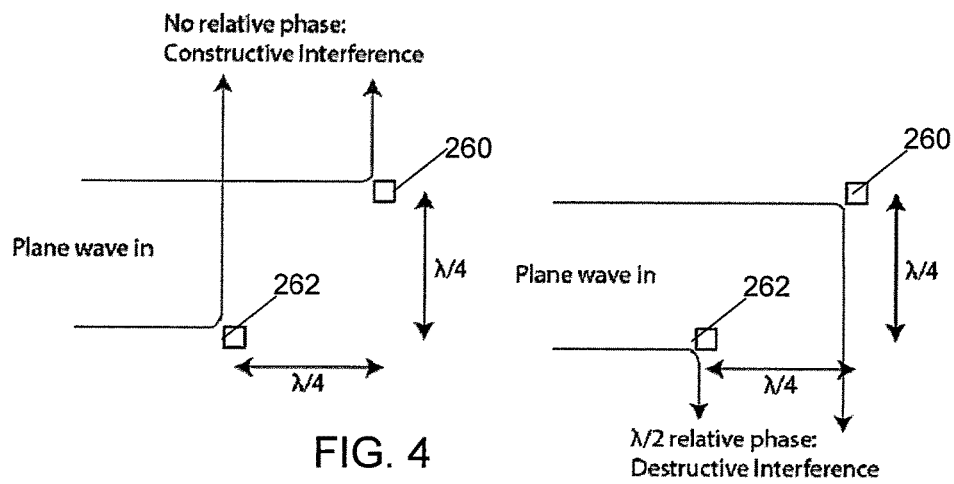
FIG. 4 illustrates how constructive interference in a two-element scattering unit can direct power up, and destructive interference ensure that little or none is radiated down.

We show the design of efficient, vertical (out-of-plane) fiber-to-chip couplers for silicon photonics, monolithically integrated into state-of-the-art electronics CMOS. In one embodiment, the designs improve upon standard grating couplers in photonics by breaking the symmetry of the structure (see FIG. 4) to radiate all or nearly all optical power, incident in an optical waveguide upon the coupler, up and nearly none, or very little by comparison, downward. In the other direction, for the purpose of entry of an out-of-plane optical signal to a photodiode on chip, for example, by Lorentz reciprocity of Maxwell's equations, equal efficiency improvement from this design is gained in the reverse direction—for a signal incident downward from above the grating, coupling into the waveguide on chip. This unidirectional coupling is done by placing properly spaced upper 260 and lower 262 effective scatterers in the waveguide light path; in the illustration in FIG. 4, these are approximately (effectively) one-quarter wavelength apart in both the vertical and horizontal dimensions. In general, in high index contrast structures, such as those incorporating silicon (index around 3.5) interfaced with silicon dioxide (silica) (index around 1.45) or silicon nitride (index around 2), the inhomogeneous medium means there isn't a trivial single wavelength in the medium based on which a quarter wavelength spacing could provide a good design, but an analogous constructive and destructive interference design are available because there is an effective wavelength within the inhomogeneous-refractive-index structure. To a first approximation, the effective index of the grating is the average of the refractive index along the propagation direction within the grating. The effective wavelength is then the free space wavelength divided by the effective index. Furthermore, out-of-plane confinement of the light in the waveguide further reduces the effective index. Finally, the strong grating strength of high index contrast structures leads to reflection and further corrections to effective index and wavelength. In general, a numerical solution of the Bloch modes of the periodic structure may provide an appropriate effective wavelength.

Typically, scatterers formed in the body or active silicon layers, and those in the polysilicon layers, have leading edges, the edges closest to the input waveguide, separated by more than 100 nanometers in the device layer plane, along the propagation direction from the input waveguide into the grating. In various embodiments, this edge spacing is between 100 nm and 2000 nm, and the scatterers are at heights normal to the plane of the chip differing by 25 nm to 500 nm. Further, couplers having a scatterer closest to the waveguide in the body or active silicon layer divert light away from the substrate ("upward"), and couplers having a scatterer closest to the waveguide on polysilicon layer in each scattering unit divert light toward the substrate ("downward"). More generally, geometries may be employed that break the vertical and horizontal symmetry of each grating element in other ways and accomplish similar effect.

Figure 5:
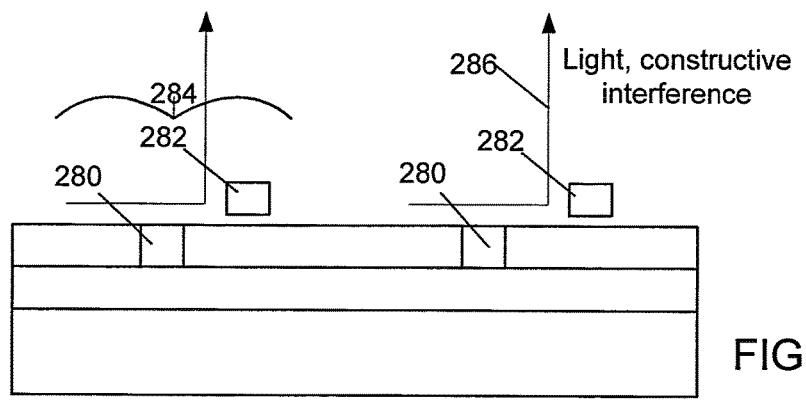
FIG. 5 illustrates scatterers formed of polysilicon gates and crystalline silicon shapes defined by oxide isolation on either side of a waveguide formed in the transistor body layer of an SOI process.

These scatterer positions are inspired by array antenna design, and make effective use of the available CMOS layers, particularly the polycrystalline silicon gate and crystalline body silicon layers normally provided for MOSFET transistors. In these layers, radiator elements are patterned to produce a unidirectional radiation pattern, as illustrated in FIG. 5, with an upper layer of scatterers 282 formed of gate polysilicon shapes, and a lower layer of scatterers 280 formed of crystalline silicon shapes (such as, in FIG. 1, silicon shape 120 defined by surrounding oxide plugs or shallow trench isolation (STI) oxide 107) in the body layer 106, causing constructive interference 286 in a vertical direction.

The design of a coupler illustrated herein is a compound grating structure, including repeated scattering "antenna elements" 284 (FIG. 5) each of which includes two blocks 280, 282 (FIG. 5), and produces destructive interference downward and constructive interference upward for gratings that couple upwards. In one simulated example, unidirectional grating designs proposed here show very high directivity of 50:1 (ratio of upward-radiated power to downward-radiated power), and a bandwidth of about 100 nm. Because they are uniformly periodic in this example, they have an insertion loss theoretically limited to no more than 80% by the mode mismatch of the grating radiation pattern and the optical fiber mode. In this example the efficiency is 75% giving an estimated insertion loss of about 1.2 dB, a 3 dB improvement over standard uniform gratings whose bi-directionality limits their coupling loss no better than (i.e. no less than) 4.2 dB. In the upward-radiating design, upper block 282 is further away from the input waveguide, along the propagation direction from the input waveguide into the grating, than lower block 280. To arrive at downward radiating designs, the order is reversed (and the block dimensions may need to be adjusted).

Figure 6:
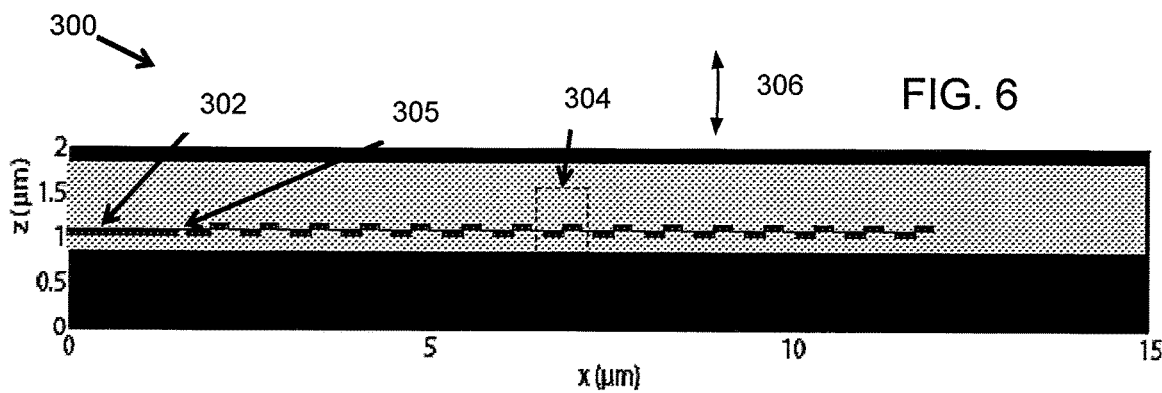
FIG. 6 illustrates a coupler in cross section.
Figure 7:
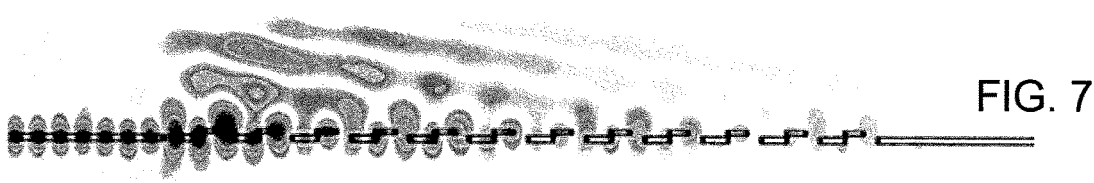
FIG. 7 illustrates the simulated electric field distribution (field strength amplitude vs. position) for a coupler configured to couple light from a waveguide into an upward propagating beam.

An example grating coupler 300 is illustrated in cross section in FIG. 6, where a waveguide 302 in body layer optically couples with blocks 304 of two scatterers each, one on each of body layer and polysilicon layer, to divert light between waveguide 302 and the vertical 306. Alternatively, the waveguide 302 may be implemented in the polysilicon layer, or in a combination of the polysilicon and body layers, with minimal change to the design of the grating and scatterer block 304. Scatterers on polysilicon and body layers are typically vertically separated by a thin gate oxide 305, which may be supplemented by transparent nitride barrier and high-k gate layers as known in the CMOS-SOI art.

We also propose an efficient approach to "optical through-silicon vias" to enable low-loss optical coupling between dies in a multi-die stack. We show the optimum design of finite reach vias, and discuss the design of unidirectional grating structures to realize them. Efficient fiber-to-chip and chip-to-chip coupling is critical to future integrated photonic interconnect applications including energy efficient CPU-to-memory interconnects.

Long Vertical Couplers, with Uniform Grating Parameters

Figure 13:
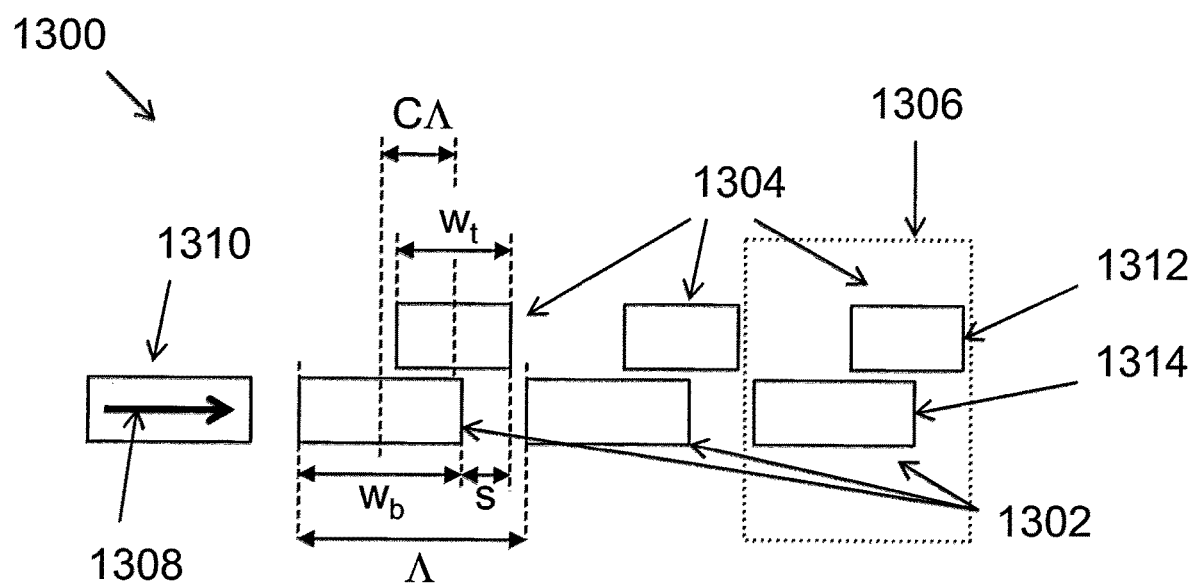
FIG. 13 illustrates grating parameters such as top width, bottom width, and spacing.

In discussing uniform gratings for some embodiments, we have four grating parameters, based on the layout parameters in the cross sectional diagram 1300 of FIG. 13. These four parameters are:

$$\Lambda, \quad (1)$$

$$\delta_b = w_b/\Lambda, \quad (2)$$

$$r_t = w_t/w_b, \quad (3)$$

$$s = C\Lambda - (1-r_t)\delta_b\Lambda/2. \quad (4)$$

where L is the period of the structure; $\delta_b$ is the width of the bottom scatterer 1302, expressed as a fraction of the period L ($w_b$ is the width of the bottom scatterer 1302); $r_t$ is the ratio of widths of the top scatterer and the bottom scatterer ($w_t$ is the width of the top scatterer 1304); and s is the shift or offset of a top scatterer 1304 relative to a corresponding bottom scatterer 1302 within a scattering unit cell 1306 measured along the direction of propagation 1308. The shift s is defined, referencing from the input waveguide 1310 in the propagation direction of light 1308 into the grating, as the distance from the trailing edge 1312 (further away from the input waveguide) of the top scatterer to the trailing edge 1314 of the bottom scatterer. If the top scatterer trailing edge 1312 is further from the input waveguide than the trailing edge 1314 of the bottom scatterer, then s is a positive distance. If the top scatterer trailing edge is closer to the input than the bottom scatterer trailing edge, then s is negative. The shift s is a key parameter used to break the symmetry and design for unidirectional propagation. Equation (4) relates s to another way of stating the shift, the parameter C. The parameter C is simply a different shift definition from s, and measures a distance from the—center—of the top scatterer along the propagation direction to the center of the bottom scatterer. If the center of the top scatterer is further from the input waveguide than the bottom scatterer, this makes C positive. The parameters are illustrated in FIG. 13.

Figure 12:
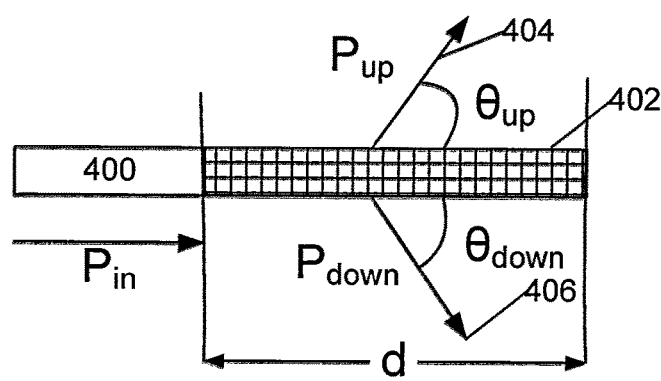
FIG. 12 illustrates simulated or measured power and angles.

These parameters in turn determine the ratios of waveguide 400 power to coupler 402 up-power $P_{up}$ 404, coupler down power $P_{down}$ 406, up angle $\theta_{up}$, and down angle $\theta_{down}$ illustrated in FIG. 12.

We have designed gratings with unidirectivity in the up direction with corresponding parameter values: $\Lambda$=779 nm, $\delta_b$=0.75, $r_t$=1.1, s=+266 nm (for C=+0.378), and with length along the x axis (i.e. the propagation direction along the grating) of 76.16 μm (this is the shortest length which gives $P_{up}$=96%). Also, we have designed gratings with unidirectivity in the down direction with corresponding parameter values: $\Lambda$=779 nm, $\delta_b$=0.86, $r_t$=0.75, s=−282 nm (for C=−0.47), and with length along the x axis of 47.55 μm (the shortest length which gives $P_{down}$=96%). Simulated results showed a 90% (0.5 dB) coupling bandwidth of 100 nanometers centered on a 1550 nanometer wavelength.

FIG. 13 illustrates a width $w_t$ and space $s_t$ for the upper grating elements, and a width $w_b$ and space $s_b$ for lower grating elements. It is assumed that $\Lambda=w_t+s_t=w_b+s_b$ for uniform grids.

Figure 8A:
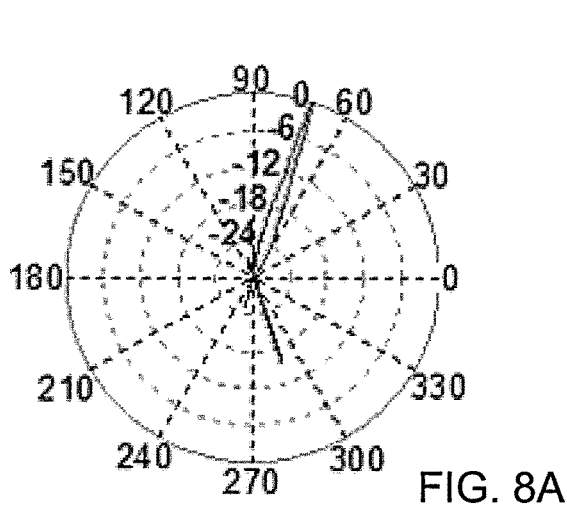
FIG. 8A illustrates a simulated radiation pattern, using a decibel scale on a radial axis indicating substantially upward directivity for an embodiment configured as a vertical coupler in the upwards direction.
Figure 9A:
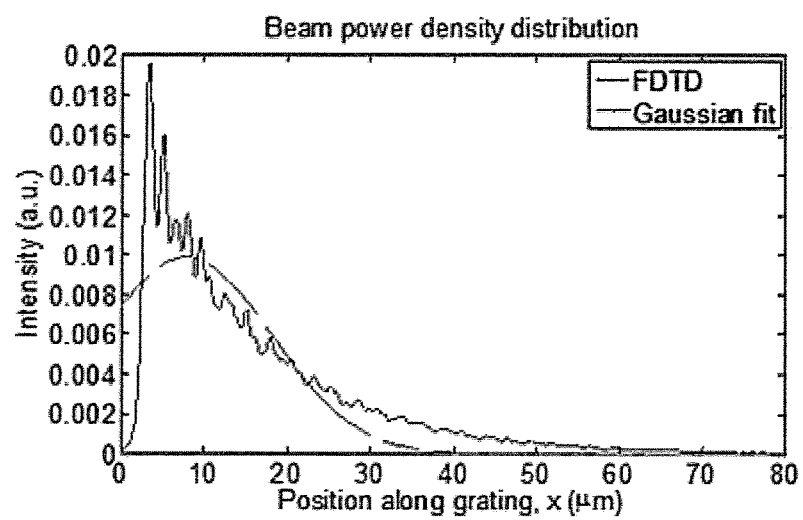
FIG. 9A illustrates simulated upwards power versus position along a coupler for an embodiment configured as a vertical coupler in the upwards direction.
Figure 9B:
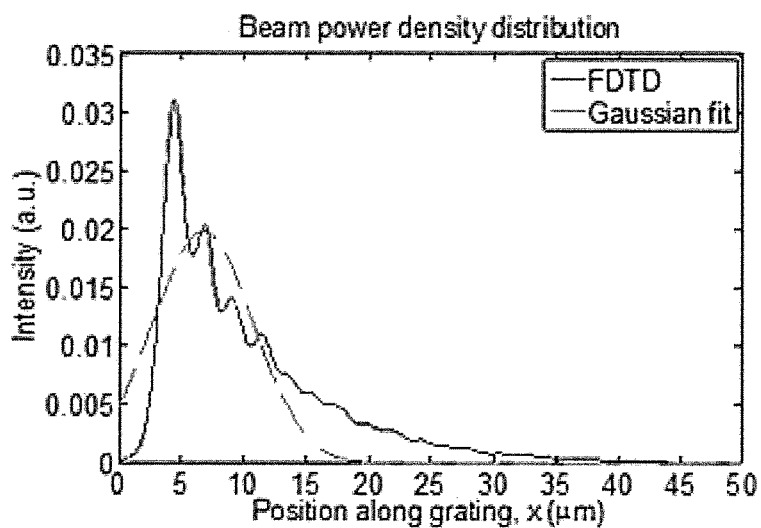
FIG. 9B illustrates simulated downward power versus position along a coupler for an embodiment configured as a vertical coupler in the downwards direction.

FIG. 9A illustrates simulated upwards power versus position along a coupler for an embodiment configured as a vertical coupler in the upwards direction, and FIG. 9B illustrates simulated downward power versus position for an embodiment configured as a vertical coupler in the downwards direction. A grating configured for up radiation direction at $\lambda$=1550 nm has $P_{up}$=96% radiated power in the up direction, $P_{down}$=3% radiated power in the down direction, and reflected and transmitted guided powers are both 0.5%. It has the most efficient coupling to a Gaussian beam mode, at a wavelength of 1550 nm, of 76.78%. This is compatible with a fiber having a large mode with MFD=38.73 μm in the longitudinal direction along the grating, at an off-normal angle $\theta_{up}$=12.6°. FIG. 8A depicts an example radiation pattern in the x-y plane, in dB scale, with an upward beam at, an off-normal angle of 12.6°.

Figure 8B:
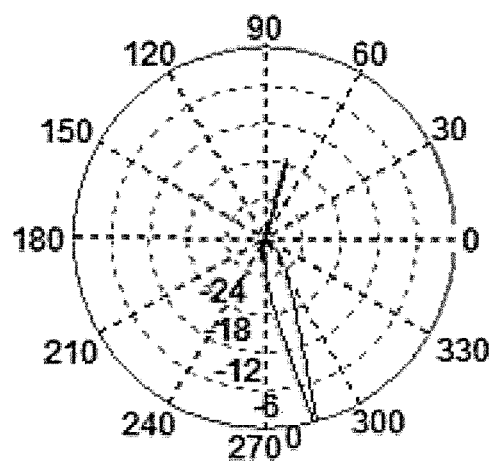
FIG. 8B illustrates a simulated radiation pattern with a decibel scale on radial axis indicating substantially downward directivity for an embodiment configured as a vertical coupler in the downwards direction.

A grating configured for down radiation direction at $\lambda$=1550 nm has $P_{down}$=98% radiated power in the down direction (FIG. 8B), $P_{up}$=2% radiated power in up direction, and reflected and transmitted guided powers are both near 0%. It has the most efficient coupling at $\lambda$=1550 nm of 83% with a Gaussian beam or a fiber mode with field diameter along the grating propagation axis of MFD=21.37 μm and inclined at an off-normal angle $\theta_{down}$=10.4°(See FIG. 9B).

Because of the length and weak strengths of both gratings, the MFDs of these embodiments are too large for most efficient coupling with a standard single-mode fiber because such fibers typically have a 10 micron mode field diameter.

Figure 10:
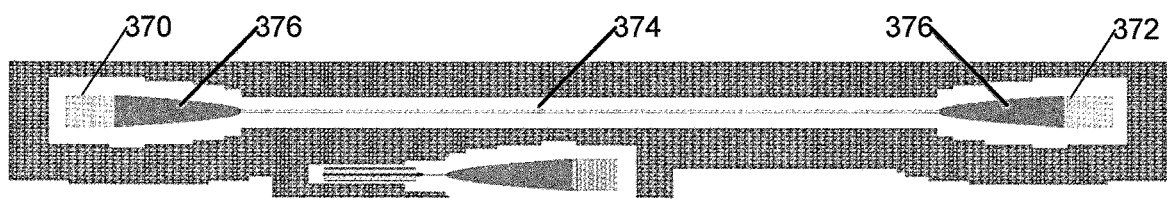
FIG. 10 illustrates the mask layout of a test structure having an optical waveguide with two couplers, used for experimental measurements.

FIG. 10 illustrates a layout of a test structure having two couplers 370, 372 interconnected by a waveguide portion 374, with tapered sections 376 to permit spreading of the waveguide mode from sub-micron single mode width to a width consistent with the width of the launched beam, at each end of the structure.

Short Grating Couplers

Figure 10A:
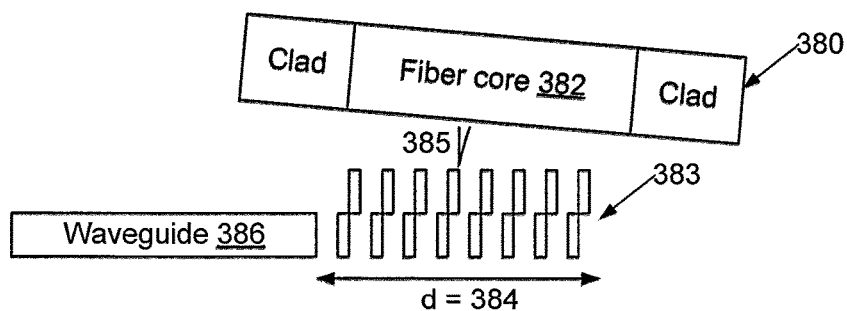
FIG. 10A illustrates a short coupler configured to couple light from a waveguide into an optical fiber.

Since it may be desired to couple power into or from a single-mode optical fiber 380 (FIG. 10A) having a small core 382 diameter (and hence a small mode field diameter, MFD), lengthy couplers formed from weak scatterers may not be appropriate in some applications. We therefore consider short couplers 383 having length 384 on the order of a core diameter of a single-mode optical fiber, such that the grating coupler can be aligned beneath the fiber and serve to couple light between waveguide 386 and fiber 380. Such a coupler may emit light at an angle 385 from perpendicular into a fiber.

A short grating designed for up radiation at $\lambda=1550$ nm has $P_{up}=65.4\%$ radiated power in up direction, $P_{down}=2.3\%$ radiated power in down direction, and reflected and transmitted guided powers are 1% and 31.3%, respectively. It has the most efficient coupling at $\lambda=1550$ nm of 58% with a fiber with MFD=16.1 µm and an off-normal angle $\theta_{up}=12.6°$. A large portion of power has gone into transmission. Because up radiated power has drastically decreased, this grating is no longer highly unidirectional, however, if in this grating design we change a fill factor of bottom teeth to a new value of $\delta_b=0.65$ instead of previously used $\delta_b=0.75$ and all other grating parameters and length remain intact, then at $\lambda=1550$ nm, $P_{up}=80\%$ for this short grating. This happens because now there is a stronger scattering per tooth in top and bottom core layer (tooth widths $w_t$ and $w_b$ are smaller and gaps are bigger in both cores), so power is radiated faster over a smaller length. Here, $P_{down}=8.7\%$, and reflected and transmitted guided powers are 2.6% and 8.7%, respectively. In this case, as transmission is smaller. There is greater unidirectivity of the outward radiation. This grating has the most efficient coupling at $\lambda=1550$ nm of 68.2% with a fiber of MFD=14.29 µm at an off-normal angle $\theta up=7.3°$.

Some of FDTD simulation results of a short grating with down radiation showing that $P_{down}=86\%$ of power is radiated in down direction, in up direction $P_{up}=1.7\%$, and reflected and transmitted guided powers are 0% and 12.3%, respectively. The radiated power in the down direction that is in the desired Gaussian beam mode of fiber is determined. Here, the off-normal radiation angle is $\theta down=10.4°$. We found an efficient coupling with the fiber MFD=15.1 µm and position x=8.7 µm, for $\theta_{down}=10.4°$ and $\lambda=1550$ nm. Also for these values, maximum coupling efficiency was 78%.

Using the explained uniform unidirectional grating geometry and its defined parameters (1), (2), (3) and (4), unidirectional grating can be designed in any appropriate foundry process with two core layers.

Bulk-CMOS-Compatible Couplers

Structures like FIG. 5, using the body silicon of a CMOS SOI process as a waveguide, require modification for compatibility with bulk CMOS processes such as those illustrated in FIG. 2. In an embodiment applicable to bulk CMOS processes, a directional grating coupler 1100 (FIG. 11) is fed by a waveguide 1102 formed in gate polysilicon layer. Gate polysilicon of coupler 1100 is etched into multiple polysilicon islands 1104, each island being etched with a first section 1106 having a first thickness, and a second section 1107 having a second, full, thickness equal to that used in transistor active-gate portions. In an embodiment, each island has an L-shaped cross-section. Alternatively each island may have a cross-section that is asymmetric in both the longitudinal and out of plane dimension. Since one lithographic step cannot easily produce a strong asymmetry in two dimensions, in some embodiment the island cross-section is formed using two lithographic steps. Each island may have an L-shaped cross-section. Alternatively each island may have a T or inverted-T cross-section that is asymmetric in both the longitudinal and out of plane dimension. The island cross-section may be formed using two lithographic steps, including in a particular embodiment a partial-thickness masked etch and a full-thickness masked etch, to minimize the number of etch steps. Whether the first section or the second section is proximate to waveguide 1102 determines whether the coupler concentrates light in the upwards or downwards direction. The polysilicon 1100 is formed over a transparent silicon-dioxide field oxide 1108 over a substrate 1110, and is covered by transparent dielectric 1112, typically also silicon-dioxide, the dielectric 1112 and field oxide 1108 forming cladding of waveguide 1102 and typically having a refractive index substantially less than that of polysilicon waveguide 1102. In most processes, this embodiment requires one extra masking and etching step to partially etch the polysilicon layer and form the first sections 1106 of each polysilicon island.

In a particular embodiment the first and second thickness differ by between 20 nm and 250 nm; in a particular embodiment the first thickness is approximately 125 nanometers and the second thickness is approximately 225 nm.

Figure 11:
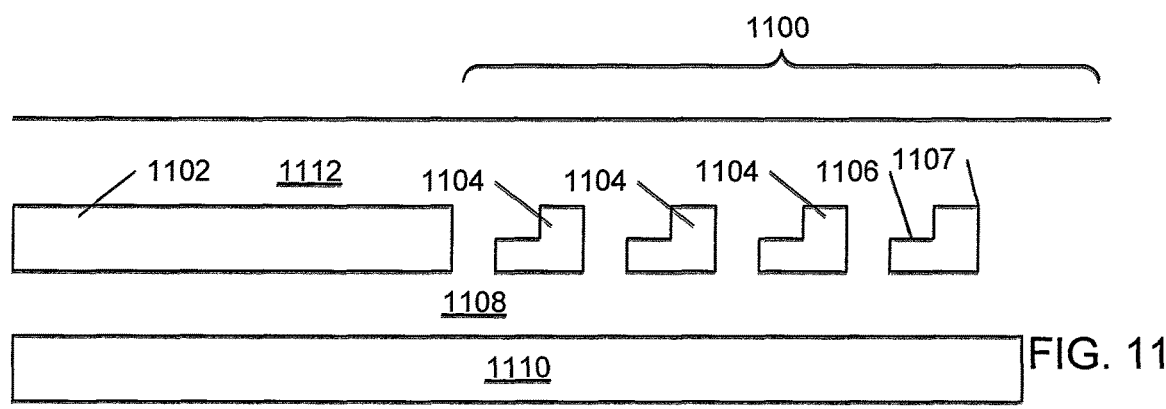
FIG. 11 illustrates a cross section of a waveguide in gate polysilicon with a directional grating coupler formed from partially and wholly-etched portions.
Figure 11A:
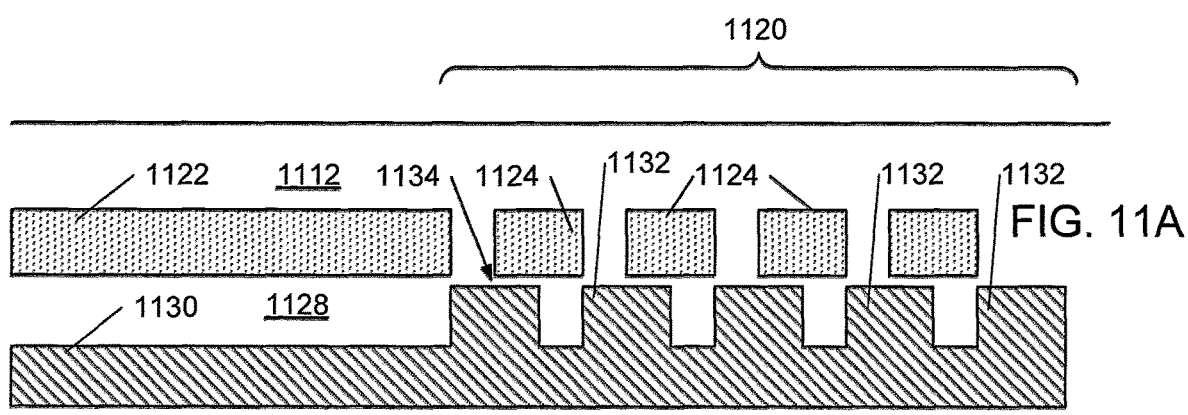
FIG. 11A illustrates a cross section of a waveguide in gate polysilicon with a directional grating coupler formed by wholly etching the polysilicon over a sequence of field-oxide and diffusion silicon shapes.

In an alternative embodiment also applicable to bulk CMOS processes, illustrated in FIG. 11A, a directional grating coupler 1120 is fed by a waveguide 1122 formed in the gate polysilicon layer. Gate polysilicon of coupler 1120 is etched into multiple polysilicon islands 1124, where each island has full polysilicon thickness. The waveguide 1122 may lie over field oxide 1128, typically silicon dioxide, over single-crystal silicon substrate 1130, which may or may not be an epitaxial layer, and may have one or more P or N wells or other doped structures within it. The directional grating coupler portion 1120, however, has multiple teeth 1132, where each tooth may be formed using a source/drain diffusion mask where field oxide 1128 is not present and unoxidized silicon is present. These teeth 1132 may, but need not, be doped N or P type by implants during CMOS processing. Teeth 1132 do not contact polysilicon islands 1124, as polysilicon islands 1124 reside above gate oxide 1134.

In the embodiments of FIGS. 11 and 11A, additional layers, such as a nitride or other high-k gate barrier layer, silicon nitride liners, or oxide isolation layers, such as sometimes used in bulk CMOS processing may, but need not, be utilized and present. It should be noted that the teeth formed where field oxide is absent and silicon is present in a bulk CMOS process and according to a source/drain diffusion mask are also used to form the sources and drains of transistors, as well as active gate area, and corresponds to a body layer of a CMOS SOI process; the term "active layer" as used herein shall both the body layer of CMOS SOI processes and these areas formed according to a source/drain mask.

Grating Couplers with Nonuniform Parameters

Figure 14:
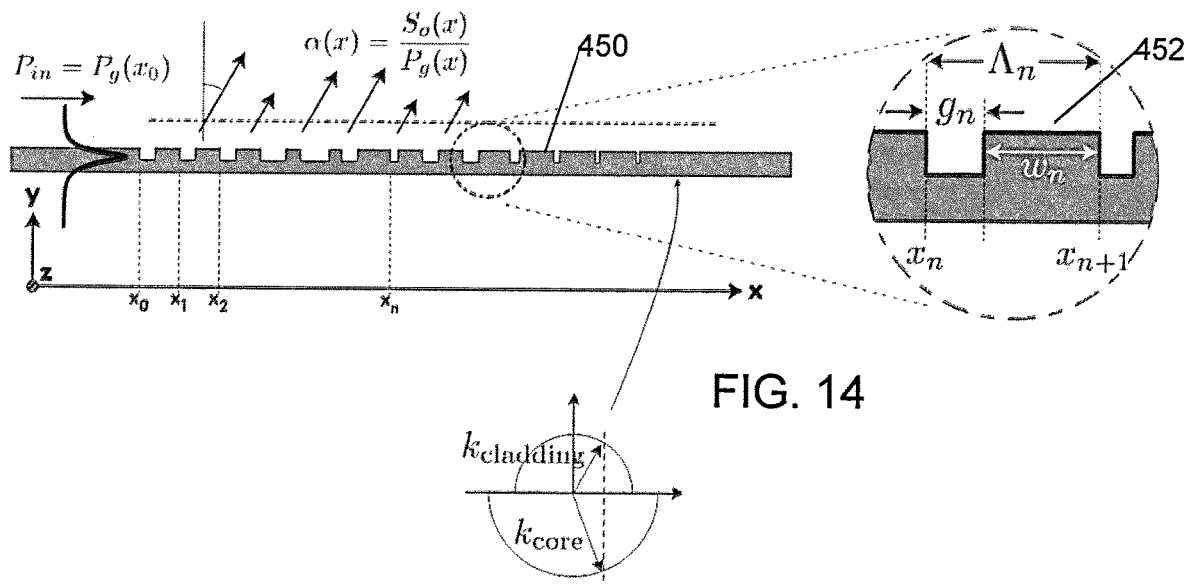
FIG. 14 illustrates a variable-parameter grating.
Figure 15:
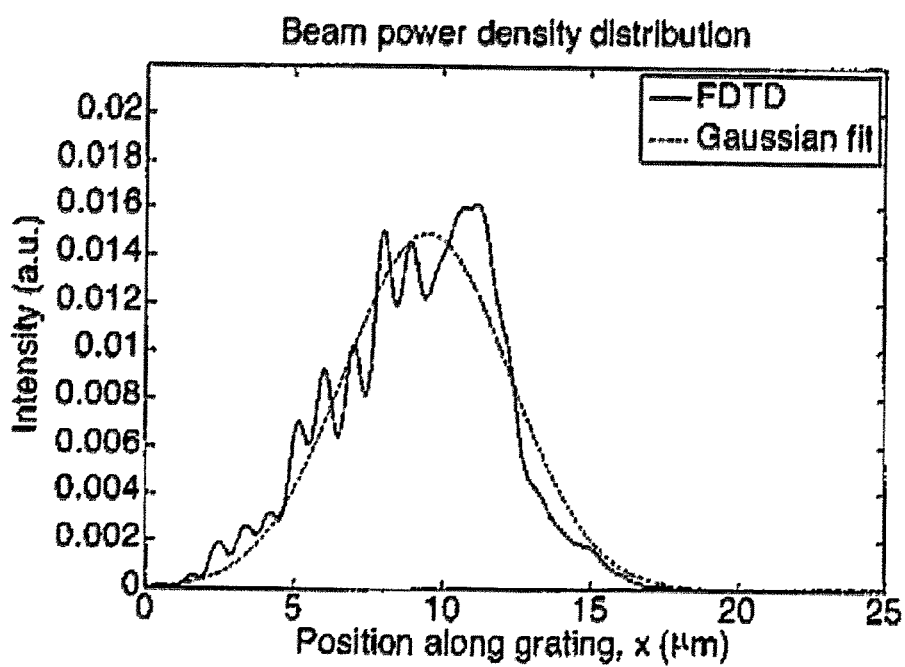
FIG. 15 illustrates a near-Gaussian beam power distribution achieved using a short grating of the variable-parameter type illustrated in FIG. 14.

The foregoing discussion has addressed gratings having uniform grating parameters throughout the length of the grating. It is possible to optimize the optical power distribution along the grating coupler and improve coupling into single-mode fibers by varying grating parameters, such as a ratio of top width to top space, and bottom width to bottom space, along the length d (FIG. 12) of a grating. Parameters of such a grating are illustrated in FIG. 14.

In this section, we describe our direct synthesis method for such gratings, and illustrate its step-by-step by application to a weak grating design first, designed to form a beam with 33.5 µm MFD.

This approach to synthesizing a grating to produce a desired output beam is based on engineering the profile of scattering strength of the structure along its length, which determines radiated power along the structure, hence the beam shape, and the grating periodicity, which determines the direction of emitted radiation. This works well for low-index contrast weak gratings, where the index perturbation does not perturb significantly the incident field in the waveguide. In high index contrast gratings which can provide sufficient scattering strength to produce beams only a few microns in diameter, such as those used in silicon microphotonics, the effective propagation constant is modified from that in the unpatterned silicon slab. Furthermore, this perturbation depends on the tooth design, i.e. the fill factor, $\delta_n = w_n/\Lambda_n$ (FIG. 14). Hence, the angle of emitted radiation will depend not only on the period but also details of the tooth design. In particular, a grating with a constant period, but varied fill factor (duty cycle) along the length will have a radiation angle that varies with the position along the length. Another consequence of strong coupling in high contrast gratings is substantial reflection per tooth, where perturbative approaches to model the grating begin to fail.

To illustrate the method, which can produce a structure to form an arbitrary beam, we describe the design of a grating coupler that produces a collimated Gaussian beam. We utilize a direct synthesis method which takes as inputs the desired MFD and radiated beam angle, and produces the structure that launches this beam from a waveguide. The method comprises the following steps in general:

1) from the desired output beam field distribution, find grating strength (i.e. scattering strength) vs. position along the grating 450;

2) from rigorous simulation, find grating strength (radiation efficiency) and radiation output angle for a uniform grating vs. parameters of the grating, fill factor δ (and period Λ), see FIG. 14 452;

3) numerically isolate the contour in Λ-δ parameter space which represents constant output radiation angle to obtain grating strength vs. δ (and corresponding Λ) at constant output angle;

4) invert this data to map grating strength vs. position to non-uniform δ(x) and Λ(x) vs. position (FIG. 4); and, 5) apply a "discretization" strategy to approximately implement the continuous target δ(x) and Λ(x) distributions as a grating with a finite number of cascaded tooth elements.

This design strategy is completely deterministic, unlike the use of global optimization algorithms, always producing the same resulting structure for a given set of input parameters.

We do not explicitly consider strong reflections per tooth in the synthesis (done elsewhere), nor as a result we do synthesize the grating exactly from the data, but instead use an approximate inversion. Nevertheless, the results show that an efficient design can be obtained by defining a continuous δ(x) and Λ(x) based on simulations, and then approximately constructing the discrete structure.

We illustrate the method first with an example structure targeted to launch a Gaussian beam with 33.5 µm MFD, at an output angle of +8° (off-normal to avoid reflections from both sides and a flat phase front. The purpose of targeting a Gaussian beam shape is to ensure good overlap with the fundamental mode of an optical fiber, thereby enabling high coupling efficiency. There are several components to achieving high coupling efficiency: maximizing mode matching of a beam to the target fiber mode, breaking top-bottom symmetry to ensure that all power is launched in only an upward or downward beam (discussed previously in this disclosure), and minimizing reflection. Our focus in this section will be mode matching.

The numerical simulation method used in the second step above is a two-dimensional finite-difference time-domain (2D FDTD) method. Alternatively mode matching, harmonic propagation or other rigorous techniques may be used to find the same simulation results. 2D simulations are sufficient for the design of collimated beams with few microns or larger lateral extent because the third (width) direction may be dealt with accurately by the effective index method, replacing the material refractive indices in the 2D simulation with values slightly corrected (lower) to account for the transverse extent of the guided mode.

Steps of the method explained in detail are:

STEP 1. We first determine the scattering strength distribution along the grating to form a radiated Gaussian with MFD=33.5 µm. The scattering strength α(x) is defined as the radiated power density $S_o(x)$ [W/m] divided by the guided power $P_g(x)$ [W]. α(x) is also the decay rate of the power in the waveguide, $S_o(x) = -d/dx\ P_g(x) = \alpha(x)\ P_g(x)$. It may be obtained directly from the desired output beam power density $S_o(x)$ through the following $$\alpha(x) = \frac{S_o(x)}{1 - \int_0^x S_o(x')dx'}. \tag{8}$$

where for a Gaussian beam, as in the present example, $$S_o(x) = \frac{1}{\sqrt{2\pi(0.25\ MFD)^2}} \exp\left(-\frac{(x-m)^2}{2(0.25\ MFD)^2}\right) \tag{9}$$

where x=0 is the truncation point at the beginning of the grating, and x=m is the center of the desired output beam intensity profile. For our example case, α(x), where the center position of the Gaussian was placed at m=1.072 MFD=35.9 µm, so that at x=0 the Gaussian has an intensity that is 1% of maximum.

STEPS 2 and 3. To convert this α(x) distribution to a non-uniform grating design, we now find α vs. tooth fill factor δ, by simulating uniform gratings. In general, a plot of α (and radiation angle) vs. fill factor δ (and period Λ) is needed. To avoid the need to simulate a complete two-dimensional parameter space, only to collapse it to a 1D contour in that space that represents the desired radiation angle, we instead put FDTD simulations through an iterative method to converge on the correct uniform grating period Λ, for each value of fill factor δ. This can be done because this sub-problem is typically smooth and has a single solution. The starting guess for the period, $\Lambda_0$, is obtained from the propagation constant β of the waveguide mode entering the grating and the output radiation angle θ ($\theta_{target}$) as $$k_{x,target} \equiv k_{cladding} \sin\theta = \beta + \frac{2\pi}{\Lambda_0}m \approx \beta + \frac{2\pi}{\Lambda}m. \tag{10}$$

Where m is the chosen diffraction order (here, and usually, m=−1), and $k_{cladding}$ is the k-vector in the uniform cladding above the grating). The approximation here is in β, because the field within the strong grating structure is, in general, not well described by the propagation constant of the unpatterned exciting waveguide, and an exact equality will exist with some "effective" propagation constant in the grating. Based on the starting guess, at iteration n in FDTD simulation yields the actual angle $\theta_{actual}^{(n)}$ ($k_{x,actual}^{(n)}=k_{cladding}$ sin $\theta_{actual}^{(n)}$) and the period after iteration n is updated until convergence $|\theta_{actual}^{(n)}-\theta_{target}|<\theta_{tolerance}$ (in our examples, $\theta_{tolerance}=0.1°$ using $$\Lambda_n = \frac{2\pi}{\frac{2\pi}{\Lambda_{n-1}} + k_{x,actual}^{(n)} - k_{x,target}}. \quad (11)$$

This simulation process produces simultaneously two design curves. First, it provides Λ(δ), i.e. period vs. fill factor, for a fixed output angle. Second, power decay rate α is obtained from the simulated radiation power density at a horizontal observation plane above the structure, since the uniform grating simulated (for one radiation angle θ, fill factor δ and period Λ) has a single exponential power decay along length, exp(−βx). This is true except when more than one grating order is excited efficiently; in this case, a more involved procedure is required to disembed α. Extracting the decay constant α in each simulated case by a linear fit of the log of the radiation gives scattering strength α vs. fill factor δ at the radiation angle θ of interest.

STEP 4. The next step is to synthesize the grating structure from the parametrized design curves. The first step here is to synthesize functions δ(x) and Λ(x), which we define as continuous functions, from the desired α(x). To do this, we need to invert the function. Before starting inversion there is one caveat—the "inverse" of the function is double valued, i.e. there are two values of fill factor δ that give a particular α, one above and one below the strongest scattering fill factor, $\delta_{max}\approx 0.6$. Thus, we must choose one branch of the function to invert, in this case either $\delta>\delta_{max}$ or $\delta<\delta_{max}$.

There is an important physical distinction between the two designs. The large δ case has small low-index gaps in a primarily silicon slab, while the small δ case has small silicon "ribs"/teeth in an unguided cladding. Thus, the latter case is a worse approximation of scattering power from a guided slab mode and will produce larger radiative losses. Another way to understand this is that the small δ case has a lower "effective" propagation constant of the guided light in the grating, which is closer to the radiation spectrum, and thus scattering to many radiation modes is more likely from perturbations. We choose the large-δ case for this reason.

To allow simpler inversion of α(δ), we fit a 4th-order polynomial to ln α vs. δ. Then, Λ is computed by direct inversion, while δ is found by numerical inversion of the chosen branch of the fit.

The reader may observe a flat region in δ(x) and Λ(x). This occurs because the desired grating strength for a Gaussian beam is too large, and the largest grating strength achievable with the example grating is not large enough. Hence, the strength α(x) is "capped" at the maximum grating strength. In the present case, this isn't a concern because the majority of the Gaussian to be synthesized is within the realizable grating strength range, and the α(x) distribution is "capped" only toward the end tail of the Gaussian. However, this continuously rising required grating strength is typical for a Gaussian, which has rapid field fall-off as exp(−x²), whereas it will be flat (constant) for distributions with exponential tails that are more typical of waveguide and fiber modes. A wise choice of launch field may thus significantly impact realizability of a grating structure in terms of achievable dimensions, with implications for loss.

Step 5. The final step in the synthesis procedure is the translation of δ(x) and Λ(x) into a physical structure in step-index materials and compatible with layered, lithography-based manufacture. Since we defined δ(x) and Λ(x) as continuous functions of x, a discretization strategy is needed to produce a discrete grating structure that can be interpreted as producing the best approximation (or, rather, interpretation, because there is not an "exact" implementation) of these continuous functions. The following are two possible strategies:

1) Discrete sampling strategy: Choose a starting position $x_0$ (relative to the output beam); find $\delta_n=\delta(x_n)$, $\Lambda_n=\Lambda(x_n)$, $w_n=\delta_n\Lambda_n$, $g_n=\Lambda_n-w_n$, and $x_{n+1}=x_n+\Lambda_n$.
2) Integrated sampling strategy: Choose a starting position $x_0$. For each $x_n$, find a next position $x_{n+1}$ so that the average of the period function Λ(x) from $x_n$ to $x_{n+1}$ is equal to $x_{n+1}-x_n$ (which is the local period between $x_n$ and $x_{n+1}$). For the fill factor, use the average of δ(x) between $x_n$ and $x_{n+1}$.

For simplicity, we used the first strategy in the examples herein. The resulting grating is non-uniform because it radiates at a non-uniform rate along the grating to form the Gaussian beam shape. The non-uniform period compensates for chirp in the design (that is unwanted) that would otherwise be introduced by the non-uniform fill factor at a constant period.

The efficiency of the synthesized grating at exciting the desired beam shape is obtained from the total power radiated up, and the up-radiated power specifically launched in the desired beam mode (overlap of radiated field with Gaussian mode). The mode overlap efficiency is $$\eta = \frac{P_{beam}}{P_{up}} = \frac{0.4756}{0.4828} = 0.9851 = 98.51\%, \quad (12)$$

where $P_{beam}$ is the power fraction coupled from the input port to the Gaussian beam (or approximately to an optical fiber mode with the same MFD), and $P_{up}$ is the total fraction of input power that is radiated upward.

In part, the excellent mode overlap can be attributed to weak scattering per tooth in this grating that makes a single tooth scatterer a fairly small part of the entire structure, making a continuum approximation a good one. Thus, the continuum approximation used here needs to be examined in such cases to determine its range of applicability. In shorter, stronger gratings needed to synthesize smaller-waist beams, there will be fewer, stronger scatterers (since the periodicity is roughly related to the guided wavelength and output angle.

In the second example, to permit sufficiently strong scattering strength for a small-MFD beam, we employ a geometry that is etched completely through the grating core layer, i.e. enables greater maximum scattering strength. In addition, we choose a layer geometry that is consistent with a standard 45 nm SOI-CMOS foundry process describes the used foundry process). The result of the same algorithm, for a 10.5 μm MFD, is a grating design with length of 19.5 μm along the x axis. In used foundry process we could not change the BOX thickness, i.e. first layer bellow the grating, but algorithm designed that grating containing this effect in scattering strength α.

The Gaussian beam shape launched by this grating is illustrated in FIG. 14. The output angle here is larger, θ=+10°, because a stronger grating needs a larger angle to nearly eliminate reflection back to the input waveguide by second order diffraction. The mode overlap efficiency is η=95%. The primary cause of the reduced efficiency relative to the first example is the "coarser" implementation of the smooth synthesized response due to a shorter (fewer periods long) grating.

In general, the variable-parameter grating approach may be used to increase overlap efficiency to a fiber or shaped beam (e.g. Gaussian beam). For coupling to Gaussian beams/fiber modes, the overlap efficiency may increase from around 80% for a uniform grating to nearly 100%. The variable-parameter grating approach may be applied to the multi-level gratings based on unidirectional scattering units, by synthesizing an array of e.g. two-element unidirectional scattering units, with the same output beam angle but with varying scattering strengths. These may be combined to form a unidirectional, Gaussian-beam grating approaching nearly 100% total coupling efficiency from the waveguide to the beam.

Additional Experimentally Demonstrated Coupler Designs

The dimensions for a number of designs for unidirectional grating couplers, realized for several wavelengths of operation, are given in the Table 1. In these particular designs, a silicon body shape and a polysilicon gate shape form the scattering blocks that form the scattering unit cell, and the particular dimensions assume the presence of a nitride liner conformally over the poly gate layer, such as the nitride 114 illustrated in FIG. 1 or the nitride covering the waveguide 302 in FIG. 6. The dimensions in Table 1 also assume an oxide or similar material primarily surrounding the scattering blocks and nitride above and below. Other material configurations will result in somewhat different dimensions, as scaled by refractive index.

The four design parameters wb, wt, Λ and s are given, as well as dimensions for a different initial anti-reflection tooth, that reduces back-reflection of light incident from the on chip input waveguide into the grating coupler. AR gap gives the length of a shallow trench isolation gap before the first body tooth, and the AR offset gives the offset from this trench to the first tooth. Variations of such designs may be used to aid in minimizing reflection. The output angle in this table is given as an angle from the normal, not from the surface, unlike other specifications. If a positive number, it signifies an output beam off normal in the direction of propagation from the input waveguide toward the grating.

The 1180 nm up and down designs are designed to launch a 5 micron mode field diameter (MFD) spot, and have simulated peak coupling efficiency to fiber of about 0.9 and 1.4 dB, respectively. The 1280 nm up and down designs have simulated peak coupling efficiency of 1.2 and 1.3 dB, respectively. Note that these are uniform coupler designs, prior to apodization that may synthesize a Gaussian beam profile and further improve efficiency.

In a second set of designs, provided in Table 2, uniform grating coupler designs are given that do not provide opti-

TABLE 1

Unidirectional Grating Coupler Designs

| Design | Direction | Design Wavelen. λ (nm) | Transverse Width w (um) | Num. periods N | Output Angle θ (deg) | Output MFD d (um) | Body Width wb (nm) | Poly Width wt (nm) | Period Λ (nm) | Offset s (nm) | AR Offset nm | AR gap nm |
|---|---|---|---|---|---|---|---|---|---|---|---|---|
| EOS20-1180-U | up | 1180 | 6.5 | 12 | 16 | 5 | 400 | 240 | 700 | 350 | 34 | 100 |
| EOS20-1180-D | down | 1180 | 6.5 | 12 | 22 | 5 | 280 | 360 | 650 | -150 | 560 | 100 |
| EOS18-1280-U | up | 1280 | 6.5 | 12 | 14 | 5 | 330 | 270 | 760 | 290 | 60 | 100 |
| EOS18-1280-D | down | 1280 | 6.5 | 12 | 12 | 5 | 300 | 380 | 690 | -150 | 350 | 100 |
| EOS6-1550-U | up | 1550 | 13.2 | 15 | 12.6 | 10.5 | 584 | 643 | 779 | 266 | n/a | n/a |
| EOS6-1550-D | down | 1550 | 13.2 | 15 | 10.4 | 10.5 | 670 | 502 | 779 | -282 | n/a | n/a | mum unidirectional coupling, but may employ only one (poly or body) silicon layer.

TABLE 2

Single-Layer Grating Coupler Designs

| Design | Design Wavelen. λ (nm) | Layer | Transverse Width w (um) | Num. periods N | Output MFD d (um) | Gap g (nm) | Width w (nm) | Period Λ (nm) |
|---|---|---|---|---|---|---|---|---|
| EOS6-1550-NB | 1550 | body | 6.24 | 9 | 5 | 534 | 532 | 1066 |
| EOS6-1550-NP | 1550 | poly | 6.14 | 9 | 5 | 532 | 534 | 1066 |
| EOS6-1550-NPB | 1550 | poly + body | 6.28 | 10 | 5 | 452 | 452 | 904 |
| EOS6-1200-NB | 1200 | body | 6.28 | 12 | 5 | 286 | 534 | 820 |
| EOS6-1200-NP | 1200 | poly | 6.24 | 12 | 5 | 285 | 529 | 814 |
| EOS6-1550-NB | 1550 | poly + body | 14 | 25 | 11.8 | 202 | 604 | 806 |
| EOS18-1280-NB | 1280 | body | 6.5 | 12 | 5 | 250 | 470 | 720 |

These dimensions illustrate typical dimensions, including scattering silicon shape and gap widths, w and g, that add to the period L, of a single (not unidirectional) grating. Designs are given that are only in the poly, only in the body, or using the same pattern in both body and poly silicon. Designs for a 5 micron and 11.8 micron MFD are given. The period ranges between 700 and 1100 nm in these cases, and in general in designs will range between 500 and 1500 nm when use of weaker or stronger scatterers in design leads to a different proportion of silicon and silica used in each unit cell, thereby modifying the effective index and effective wavelength.

In an advanced SOI CMOS process, the poly gate layer may often be between 20 and 250 nm thick, and preferably between 40 and 80 nm. The body silicon layer may often be between 20 and 250 nm thick, and preferably between 60 and 100 nm. Therefore, for unidirectional grating coupler designs, the vertical spacing between poly and body shapes may be between 25 and 500 nm.

For the purposes of packaging, and chip-to-fiber and inter-layer optical coupling, the beam output/input coupling angle on a grating coupler is surface normal. However, surface normal output also may result in large reflection of light when an optical signal is incident on the grating from the input waveguide. Reflections at two end facets or grating couplers may form an unintended cavity on chip and introduce optical loss and a Fabry-Perot ripple in the spectrum. Therefore, grating couplers may be designed to couple to a beam at an off-normal angle relative to the surface normal. Tilting the output by 2 degrees either in the forward (away from input waveguide) or backward (toward waveguide) direction relative to the input waveguide, reduces reflection. Preferably the output is even more tilted, by 8-12 degrees, although embodiments may be designed to use an output tilted from 2 degree to 25 degrees from surface normal.

Systems Using Grating Couplers

Figure 16:
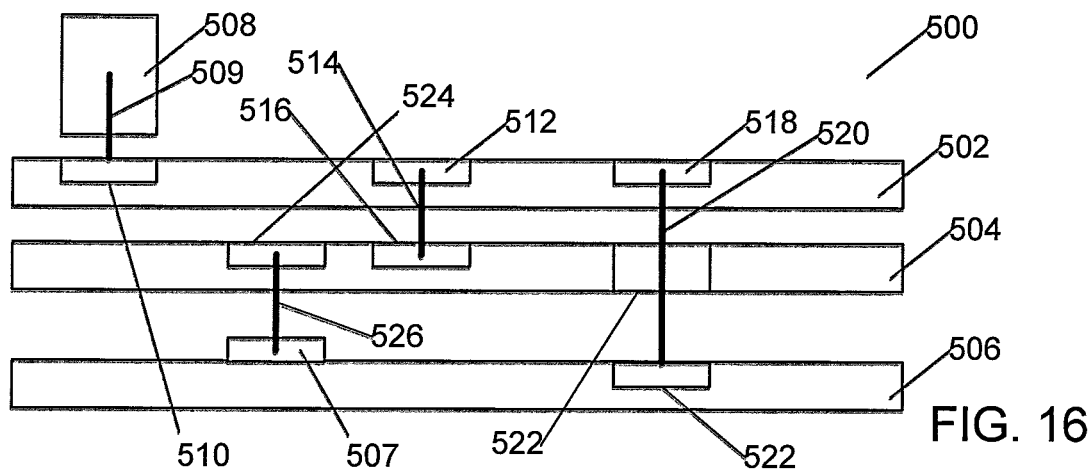
FIG. 16 illustrates how the grating couplers of present invention may be used in a system, including coupling light through vias to other couplers in another circuit.

The grating-type couplers herein described may be used to perform optical interconnect in a multichip or multiwafer system 500, having optical vias, as illustrated in FIG. 16. System 500 has multiple, stacked, optoelectronic integrated circuits or chips, 502, 504, 506, each of which may have optoelectronic components such as photodiodes (not shown), light emitting diodes (not shown), optical waveguides (not shown) between optoelectronic components and couplers or between optoelectronic components, and laser diodes 507 either monolithically integrated within it, attached to its surface in the manner of a hybrid integrated circuit, or optically coupled in via an optical fiber and grating coupler as disclosed herein. The system 500 may couple to an efferent or afferent optical fiber 508, which passes light 509 to a coupler 510 as herein described. Couplers, such as couplers 512 on a first circuit 502, may pass light 514 to a coupler 516 on an adjacent circuit, or couplers, such as coupler 518 on a first circuit 502 may pass light 520 to a coupler 522 on a third circuit 506 through a via 522 implemented in intervening circuits such as second circuit 504. Couplers, such as coupler 524, may also be positioned to receive light, such as light 526, directly from a light emitting diode or laser diode integrated within or attached to a surface of (as with laser diode 507) an adjacent circuit 506. The combination of couplers, waveguides, vias, fibers, photodiodes, and light emitting diodes together forms an optical interconnect system. Additional electrical interconnect is assumed present to, among other things, provide power to circuit 502, 504, 506.

Vias, 522, where used, may be filled with air, or may have fill of additional transparent materials, such as in certain embodiments silicon dioxide, or a polymer.

In the context of photonic on-die (on-chip), die-to-die, and chip-to-chip interconnects, we propose optical vias that enable low energy, high bandwidth and minimum footprint interconnects.

Figure 17:
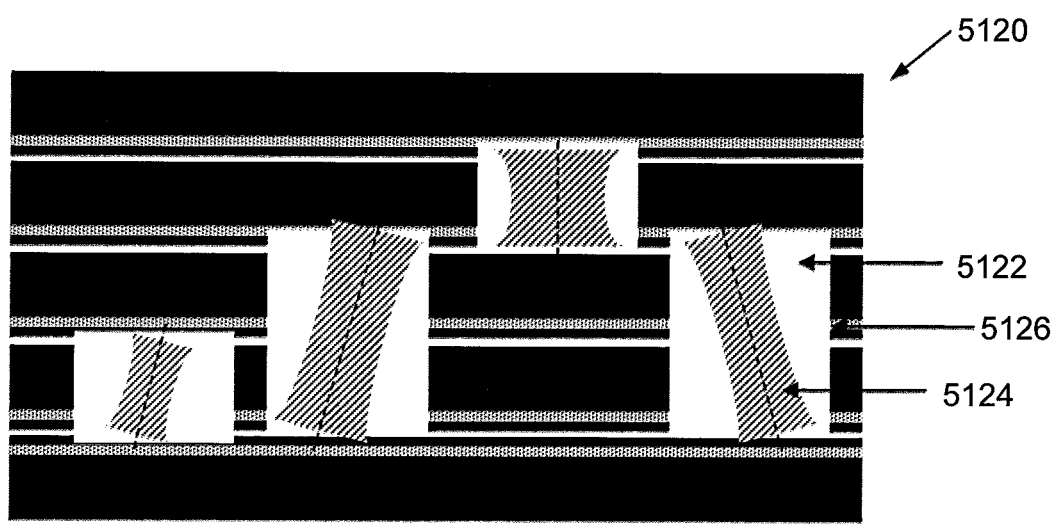
FIG. 17 is a cross section illustrating focusing optical vias using couplers of the present invention.

It should be noted that, since the upward $\theta_{up}$ or downward $\theta_{down}$ beam angles are determined largely by grating parameters such as line pitch, and the offset between shapes on the upper silicon-gate layer and lower base layer, by careful adjustment of these parameters along the length d (FIG. 10a, 12) of a coupler, a focusing effect can be achieved, as can direction of the focused light at angles through angled vias, as illustrated in FIG. 17.

Referring to FIG. 17, a multi-die stack 5120 supporting herein disclosed optical vias 5122 is illustrated. Each optical via may include a hole 5126 drilled or etched through the substrate of a die, optically connecting the device layer of the die to that another die. The optical via may support a free space optical beam 5124. The hole 5126 may be filled with primarily air or vacuum, or may be filled with a material, e.g. silica or another dielectric, a polymer, etc. The hole 5126 may include various back end of line (BEOL) dielectrics, or any other material transparent at the wavelength of interest.

The couplers herein described may also be applied to surface to surface optical coupling of two distinct optical chips, where space exists between the circuits. The space requires designs for sending and receiving an optical beam 5124, similar to those in a multi-die stack.

More generally, the couplers cooperate with optical via designs to support coupling of light from one device layer to another device layer in many geometries.

Efficient excitation of an optical beam from a guided-wave photonic device layer requires a structure capable of sending most radiation in the up or down direction, and a launch or coupler structure design able to excite efficiently the beam field profile, i.e. to maximize the overlap of launched light with the desired beam mode profile. If two identical launchers are to be used for excitation and reception of a beam, it is possible, by Lorentz reciprocity, at least in principle to achieve coupling approaching 100% from one to the other device layer. For this to be the case, the excited optical beam's intensity distribution must have point symmetry about the center point of the optical via. One family of beams that can support this are beams with a symmetric intensity profile along the x direction, for example Gaussian beams as formed by the couplers of FIG. 14.

A launched beam may be subject to diffraction. In order to avoid diffraction loss, a focusing beam launcher may be employed which excites a beam whose focal point is half way between the two device layers it couples. Beams shown exemplarily in FIG. 17 are such beams.

We may also maximize the areal bandwidth density (Gigabits per second per square millimeter of optical via area on the device layer). When grating-like, holographic beam launcher designs are used to excite the optical via beam, there is a second reason to minimize the footprint of the beam launcher—the optical bandwidth of the optical via is larger for smaller launchers.

A Gaussian beam has the following expression for the beam radius, w(z), as a function of position z along the propagation direction, where z=0 is the focal point of the beam, $$\frac{w(z)}{\lambda} = \frac{\omega_o}{\lambda}\sqrt{1+\left(\frac{z/\lambda}{\pi(w_o/\lambda)^2}\right)^2}$$

where $w_o$ is the beam radius at the beam waist (i.e. the radius of 1/e field rolloff, or $1/e^2$ intensity rolloff). We normalize to $\lambda$, the wavelength of light in the medium in which the beam is propagating ($\lambda$, $\lambda_o/n(\lambda_o)$, where $\lambda_o$ is the free space wavelength, related to the temporal frequency of the signal, and $n(\lambda_o)$ is the medium's refractive index at the wavelength).

Figure 18:
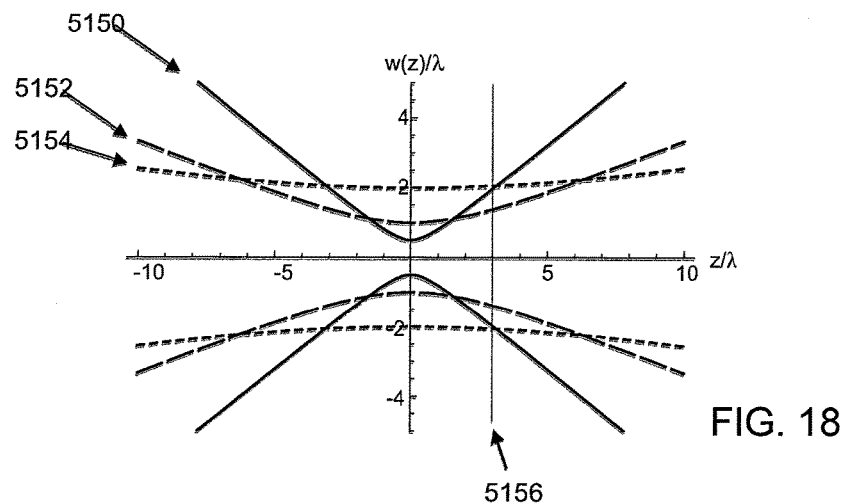
FIG. 18 is an illustration of the beam width vs. position along the propagation axis for Gaussian (focusing) beams of different waist radii.

We consider optimum designs for an optical via with a vertical (surface normal) beam. FIG. 18 illustrates plots 5150, 5152, 5154 of the normalized beam radius, $w(z)/\lambda$, vs. position z for Gaussian beams of three choices of waist size, $w_o/\lambda=\{½, 1, 2\}$ respectively. The particular beams are chosen without loss of generality and the conclusions we next illustrate apply broadly. Referring to FIG. 18, suppose we place device layers (in this picture vertically) at positions z=+/−3 wavelengths. The beam with the largest waist 5154 is larger than necessary in radius at the points where it contacts the device layers. A smaller beam could be used, as shown by the beam with the middle beam radius 5152 and its projection at the device layer 5156 at z=3 wavelengths. However, the beam with the smallest waist 5150 is larger again by the time it reaches the device layer due to diffraction. Therefore, there is a tradeoff between waist radius and diffraction, and this tradeoff depends on the length of the via, i.e. the distance between the two communicating device layers.

We also disclose the optimum beam radius for a given optical via length. The problem to be solved can be restated: Given a distance L between the two device layers and a surface normal beam, what is the smallest radius pipe through which a beam can pass with minimal optical loss, and what is that beam? First, a Gaussian beam whose focal point is half way between the two device layers provides the smallest radius pipe, and hence the smallest footprint optical via. Second, the best beam design is found by finding the beam waist radius, $w_o$, for which the beam radius at the two device layer surfaces, $w(z=L/2)$, i.e. at the launcher and receiver, is minimized. The waist at the device layers is:

$$w(L/2) = w_o\sqrt{1+\left(\frac{L/2}{\pi w_o^2/\lambda}\right)^2}$$

The minimum beam radius at the device layer as a function of the choice of waist radius is found by differentiating, and gives the optimum design $$w_o = \sqrt{\frac{L\lambda}{2\pi}}$$

and the minimum beam radius at the device layers is $$w(L/2) = \sqrt{\frac{L\lambda}{\pi}}.$$

Taking the second derivative and substituting the solution shows a positive curvature of the solution and proves that this is the minimum beam radius design. In other words, in the optimum design, the beam is square root of 2 (i.e. about 1.41) times larger radius at the device layers, $w(L/2)$, than at its narrowest point at the waist, $w_o$. This amount of diffraction turns out to happen exactly at the edge of the so-called Rayleigh range, and indeed inverting the optimum beam waist expression shows that the distance L between the two device layers, in the optimum design, is $$L = \frac{2\pi}{\lambda}w_o^2$$

and is indeed equal to the length of the Rayleigh range, i.e. twice the confocal parameter $b=k\,w_o^2/2$, where $k=2\pi/\lambda$.

Therefore, the optical via designs in one embodiment preferably include an optical beam whose waist radius $w_o$ is directly related to the distance L between the two device layers by $$w_o = \sqrt{\frac{L\lambda}{2\pi}}.$$

We will also call this choice of $w_o$ to be $w_{o,opt}$ (the optimal design). Deviations from the optimum design may still provide good performance up to a point. Specifically, we consider deviations from the optimum design using a constant B, so that the beam waist is $$w_o = B\sqrt{\frac{L\lambda}{2\pi}}$$

Here, B=1 recovers the optimal design. For a different choice of constant B in design, the beam waist at device layers is $$w(L/2) = w_{o,opt}B\sqrt{1+\frac{1}{B^4}}.$$

From this formula, we can investigate the deviation from the optimum design (B=1) that can be tolerated while maintaining a near optimum (i.e. near the minimum) optical via beam cross-section and hence via hole area. For B=1, the device layer beam radius $w(L/2)$ is square root of two times the optimum waist radius, $w_{o,opt}$, and this is the optimum design. For B>1/1.93 and B<1.93, the waist radius at the device layers, $w(L/2)$ is within a factor of square root two larger than in the optimum design, i.e. the beam spot area is no more than a factor of two larger. The beam spot area at the beam waist is then within a factor of 2+sqrt(3)=$1.93^2$=3.72 of the optimum design beam waist area, where sqrt(x) indicates the square root of a value x. For B>1/2.8 and B<2.8, the waist radius at the device layer $w(L/2)$ is within a factor of two of the optimum design, i.e. the beam area is within a factor of four of the optimum design. The beam spot area at the beam waist is then within a factor of 4+sqrt(15)=$2.8^2$=7.84 of the optimum design beam waist area.

The optical via hole will be somewhat larger than the beam radius (defined as 1/e field amplitude point) at the device surface, preferably between 1 and 2 times the beam radius, and potentially between 0.5 and 3 times the beam radius, to minimize optical interaction with the side wall. Note that the optical via beam radius, and hence the hole radius scales with the square root of the distance L traversed, so that the area scales linearly with L. Hence, optimal vias from die 1 to die 2 will be not only smaller in length but also in cross-section than optical vias from die 1 to die 3 in a die stack.

The area taken up by a via is given by the via length L times the wavelength:

$$A = \pi w(L/2)^2 = L\lambda$$

A grating coupler exciting a beam of diameter 2 $w_o$ typically has about a 20% larger dimension. Hence, the launcher/receiver coupler area is about $$A_c \approx 1.2^2 4w(L/2)^2 = 1.2^2 \frac{4L\lambda}{\pi} \approx 1.8 \ L\lambda$$

Figure 19:
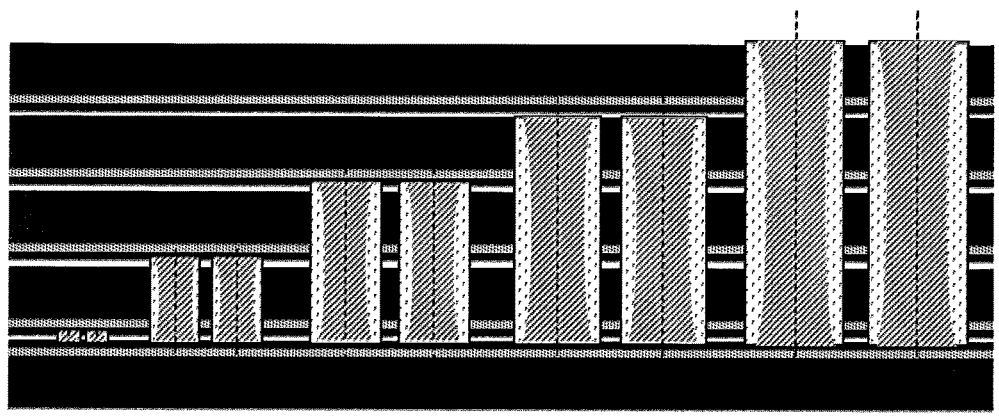
FIG. 19 is a cross section illustrating a stacked chip design having multiple beam distances.
Figure 20:
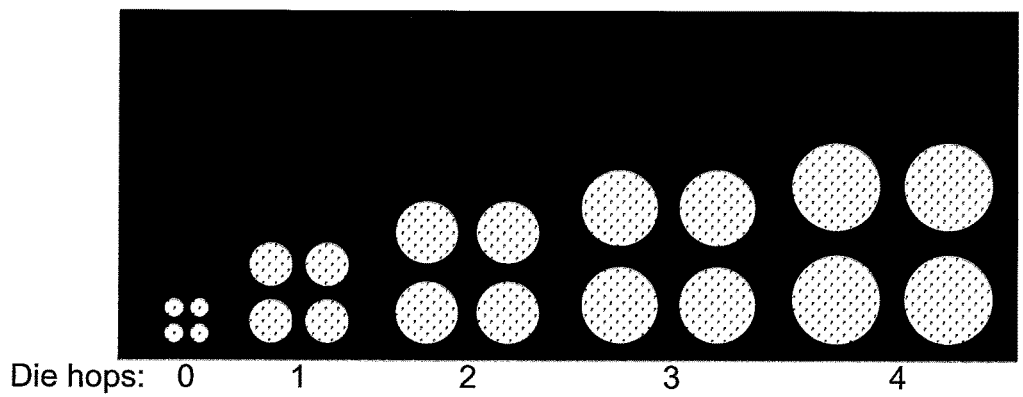
FIG. 20 is a top view illustrating that vias for different beam distances may have different diameters.

As an example, a typical die stack may employ die with substrates thinned down to about 50 micron thickness. In this case, supposing an exemplary operating wavelength of 1200 nm in air, i.e. 1200 nm wavelength in the medium, a single-hop via would have a via diameter at the launcher/receiver of about $d_{lr}=2\ w(L/2)=8.7$ microns. A 2, 3 and 4-hop via (i.e. one connecting dies that are separated by 1, 2 or 3 dies between them) have a diameter of 12.4, 15 and 17.5 microns. These are practically realizable values, are compatible with typical process tolerances for holographic beam launchers and receivers to work, and compare favorably with electrical through-silicon vias (TSVs). Note that a 0-die hop, i.e. coupling from a right side up die, to an upside die on top of it, only needs to traverse the back end of line (BEOL) dielectric stackups of the two chips, which may be about 10-20 microns, so a 0-die hop could be done with a beam diameter on the launcher of 3.9 to 5.5 microns. FIG. 19 illustrates the cross-section and FIG. 20 illustrates the top view of 0 to 4 die-hop vertical optical vias (drawn to proportion in the plane of a die, but a different scale is used in the surface normal direction for ease of illustration).

While this illustration considered surface normal beams, the same designs apply for beams inclined off the normal axis at an angle θ, e.g. to minimize reflection loss, and associated Fabry-Perot ripple and dispersion/distortion and crosstalk in the system. The off-normal angle of an optical via beam will typically be between −30 (backward radiation) and +30 (forward radiation) degrees. In the forward or backward radiation cases, the magnitude of the off-normal angle will be preferably between 5 and 25 degrees, and even more preferably around 10 degrees.

Figure 21:
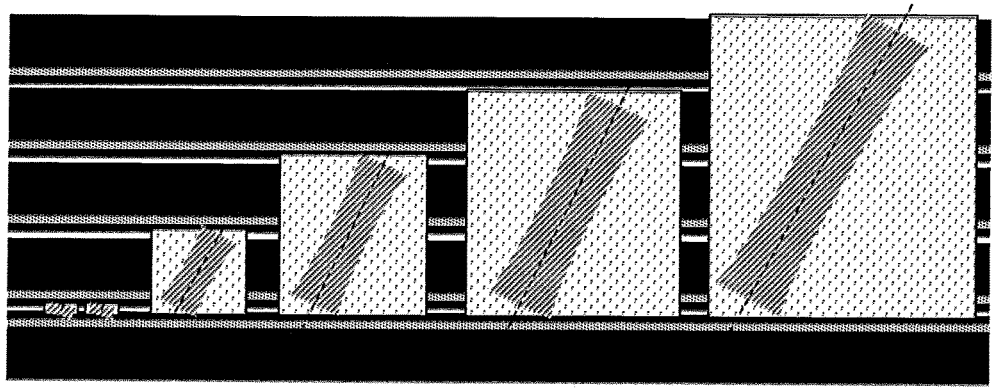
FIG. 21 is a cross sectional view illustrating use of an angled beam to reduce in-waveguide guided wave reflections and beam surface reflections.
Figure 22:
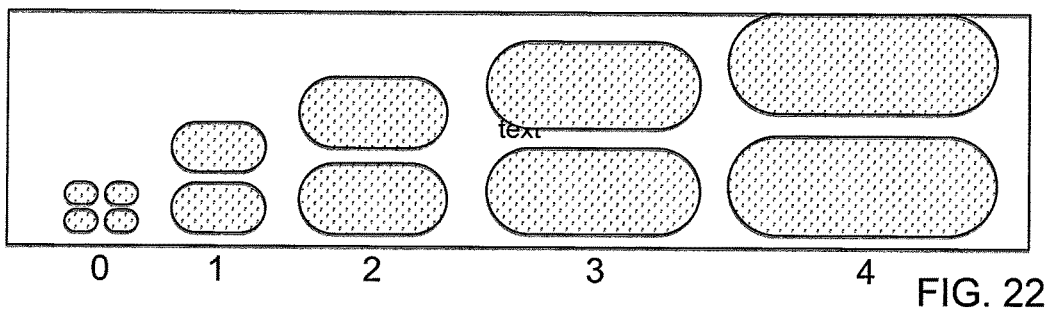
FIG. 22 is a top view illustrating elongated vias to support angled beams of FIG. 21.

FIG. 21 illustrates the cross-section in such a scenario showing 0 to 4 hop optical vias. FIG. 22 shows the top view floor plan of the via holes. In the inclined-beam case, the via hole becomes elongated, with one in-plane, cross-sectional dimension increased by $\Delta L = L \tan \theta$. For typical 0 to 4 hop cases looked at above, and for an assumed inclination angle of 10 degrees off normal for the beam, the elongation of the optical via hole is about $\Delta L = \{1.8, 8.8, 17.6, 26.4 \text{ and } 35.2\}$ microns. The elongation $\Delta L$ increases linearly with the device layer spacing unlike the beam radius which goes as the square root, and hence $\Delta L$ dominates the via hole dimensions for long (large L) vias. For few-die hops, the two contributions are comparable. The via hole elongation in cross-section represents an inefficiency in areal bandwidth density, i.e. area usage for the optical via.

Figure 23:
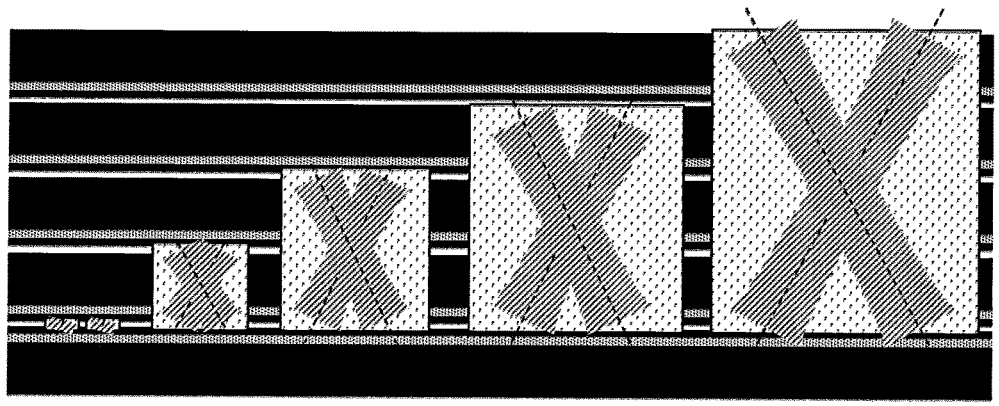
FIG. 23 is a cross sectional view illustrating use of crossed angled beams to achieve high bandwidth areal density in the area normally consumed by one angled beam.
Figure 24:
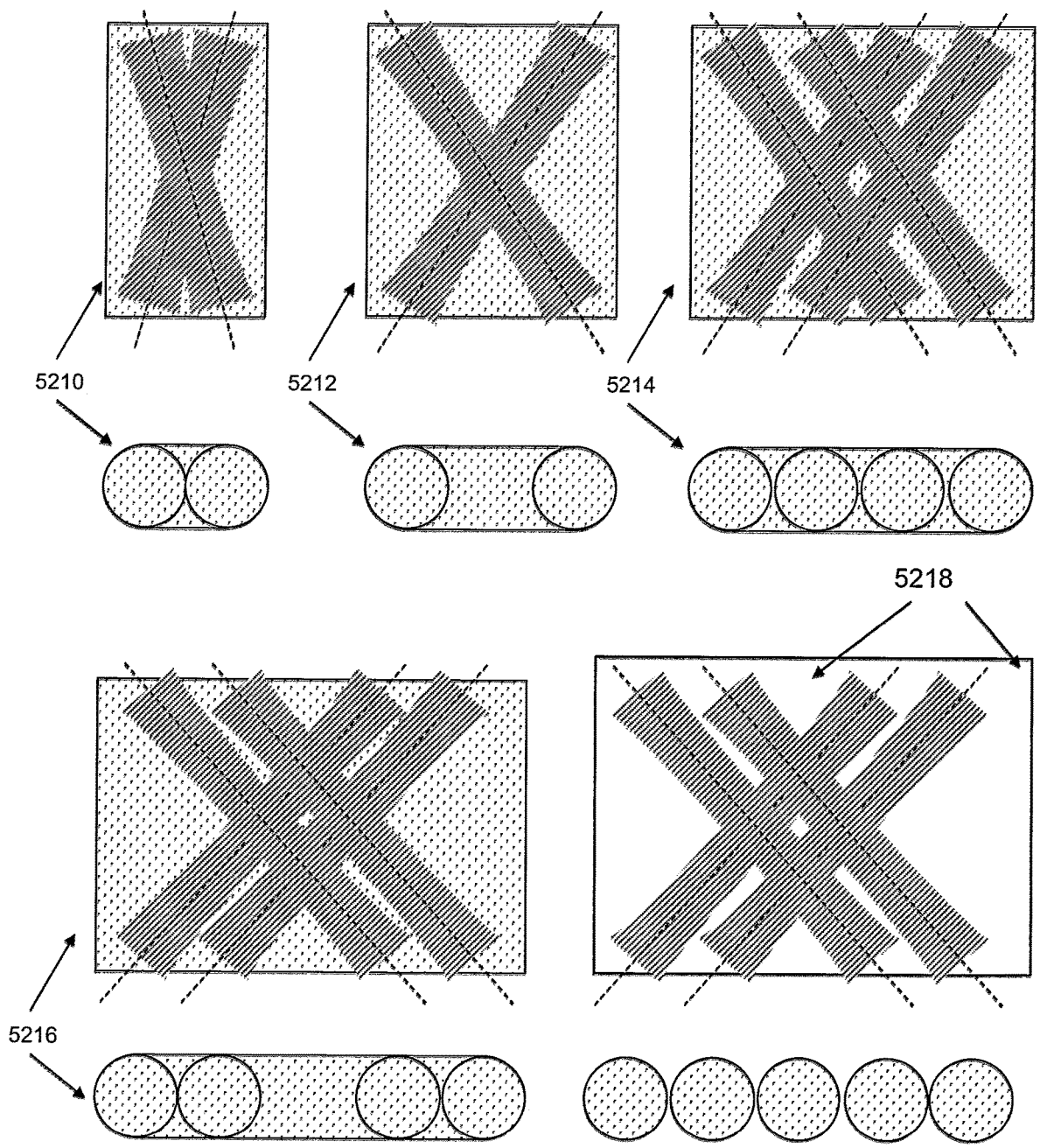
FIG. 24 is a cross sectional and top view illustrating multiple crossing beams in single vias.

If the via hole elongation $\Delta L$ is at least equal to the beam diameter, i.e. the beam launcher dimension, then two beams can be accommodated in the cross-section of FIG. 21, with opposite inclination angles, to recover near ideal via area usage, as illustrated in FIG. 23. As the off-normal beam inclination angle θ increases, for the same die stack or device layer displacement(s), $\Delta L$ increases. For small off-normal beam angles, less than 30 degrees, and preferably less than 20 degrees, the beam diameter, dlr, remains similar to the vertical (surface normal) beam design. FIG. 24 shows a few examples of maintaining high packing density of optical via beams in a via hole as the off-normal angle increases from surface normal (θ=0). As the angle increases from 0 degrees off-normal, $\Delta L$ starts from 0 (accommodates a single beam in the via hole). Referring to FIG. 24, when $\Delta L = d_{lr}$, then two opposite facing beams can fit in a single via hole 5210, and for $d_{lr} < \Delta L < 2 d_{lr}$, still only two beams can be accommodated in the via hole 5212. In this range, the areal "fill factor" decreases as $\Delta L$ increases. As the angle increases further, for $\Delta L >= 2\ d_{lr}$, a third beam can be added in between the two opposite angle beams, and a fourth beam can be added be increasing the via hole length by a beam diameter, thereby arriving at a larger via hole 5214 with a return to near 100% areal fill factor. The fill factor falls again with increasing angle as the via hole 5216 extends to 2 $d_{lr} <= \Delta L < 3\ d_{lr}$. When the angle allows $\Delta L = 3\ d_{lr}$, another beam pair 5218 can be added to recover 100% fill factor. This pattern can be followed to provide high areal bandwidth density for various choices of via optical beam angle as may be required to provide an efficient beam launcher/receiver.

Figure 25:
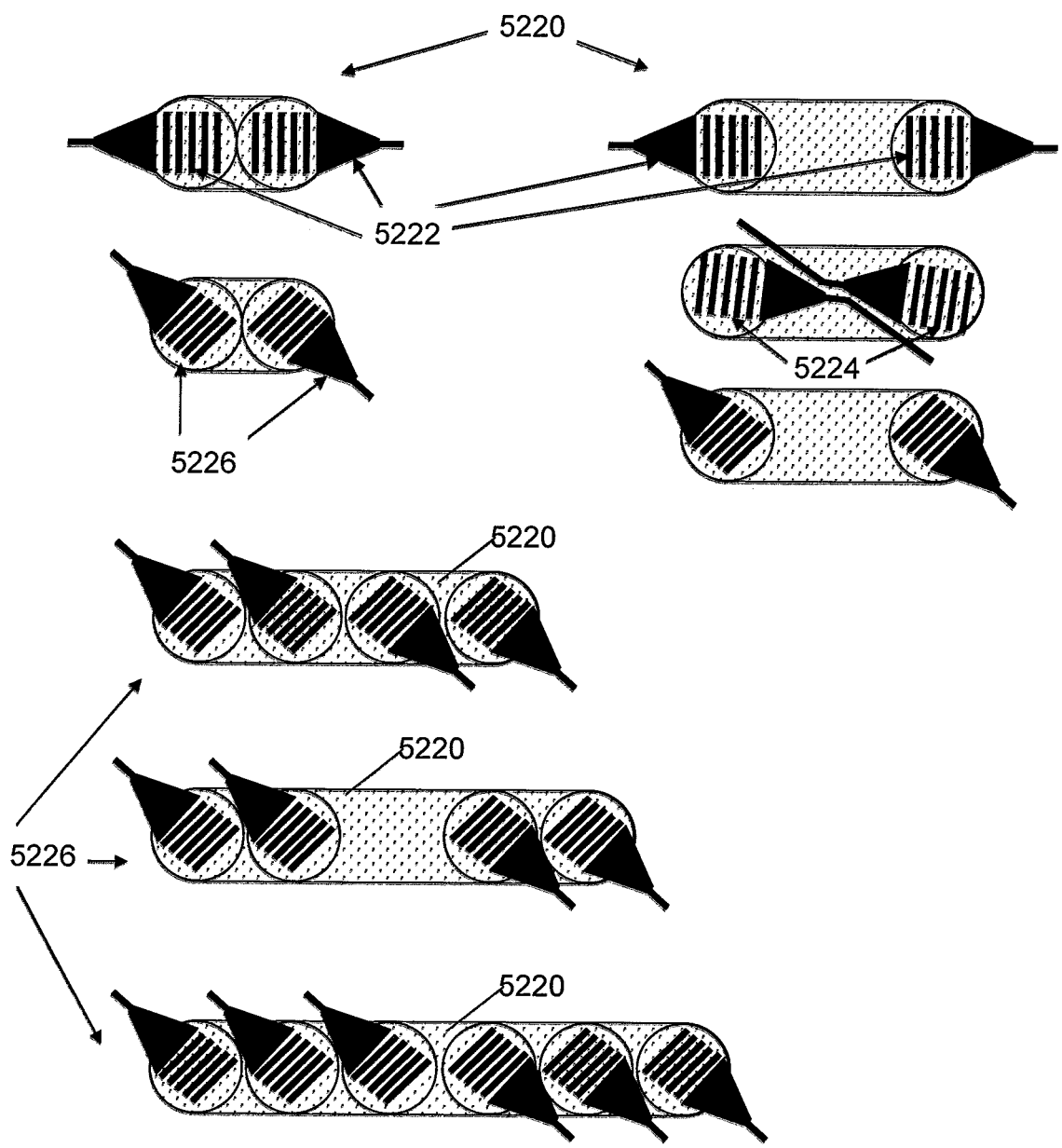
FIG. 25 is a top view illustrating possible grating coupler orientations enabling the launching and reception of multiple crossing beams in single vias.

In the multiple beam per via scheme in FIG. 24, there may be geometrical constraints on the beam launchers/receivers in the device layers as one needs to both feed each launcher/receiver from an in-plane waveguide, and ensure that the launched/received beam is pointed in the right direction. FIG. 25 shows some excitation grating launcher/receiver layouts for high bandwidth density, compatible with the described elongated optical via holes. Two-beam optical via holes 5220 can be optically excited with horizontal, facing grating couplers 222 with a forward (θ>0) beam excitation. An alternative is to use back to back in line or nearly in line grating couplers 5224 that excite backward beams. A third option is use of grating couplers (beam launchers/receivers) 5226 that have an angled orientation in the plane with respect to the long axis of the elongated via hole 5220 or 5228. This geometry is also compatible with via holes 5228 that can support more than two beams. Here, the couplers 5226 support forward beam excitation, but must also steer the beam to one side in order to couple to the corresponding grating coupler on the other end of the horizontally elongated via 5220 or 5228. To accomplish this, in one embodiment, grating couplers may be used where the grating teeth are not parallel to the phase front of the incoming waveguide mode from the feed waveguide, through the excitation taper, but rather is inclined with respect to the phase front. Specifically, in the couplers 5226 illustrated in FIG. 25, the grating tooth pattern is clockwise rotated slightly, to produce a transversely tilted wavefront and hence enable lateral steering of the beam angle.

Figure 26:
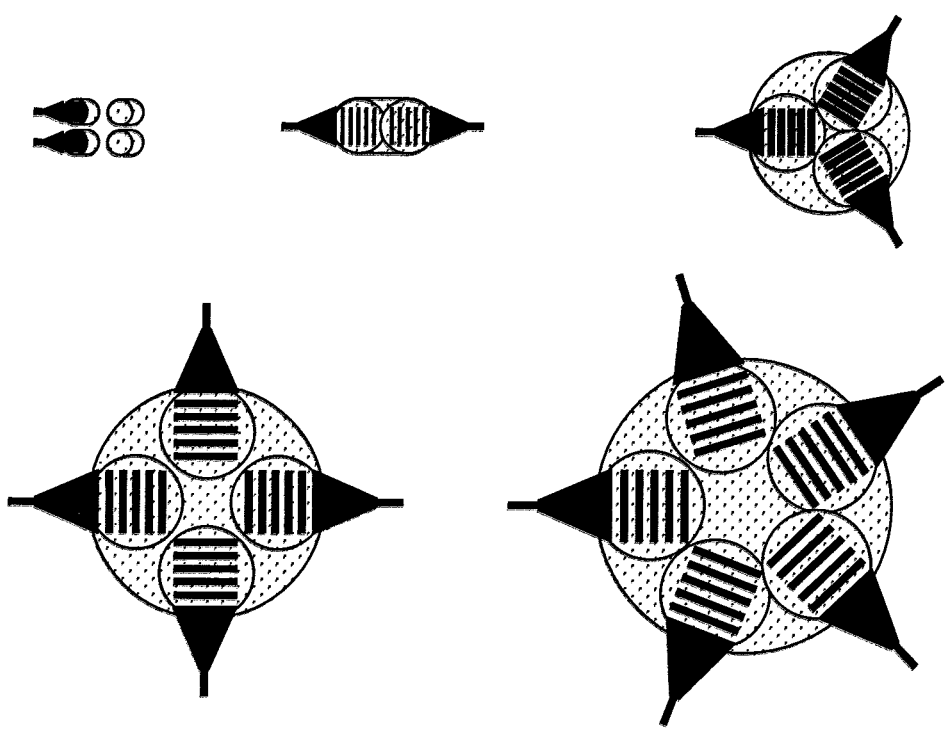
FIG. 26 is an illustration of couplers radially spaced around a common circular via, the couplers each aimed at corresponding couplers at another level of a multichip system.

The bandwidth density of multiple beam optical vias can be further increased by permitting enlargement of via footprint in the second in-plane dimension (see FIG. 26). Because optical beams can propagate through each other without any (or without significant) interaction, unlike crossing electrical wires, multiple optical beams can be packed into a single optical via hole, as already illustrated in the designs in FIGS. 23 to 25. In FIG. 26, we illustrate a circular via hole with a diameter of the elongated dimension of the via holes in FIG. 22, showing that a number of vias can be packed into the same space, by placing the beam launcher grating on a first device layer and a beam receiver grating on a second device layer on diametrically opposite ends of the via hole cross-section.

Figure 27:
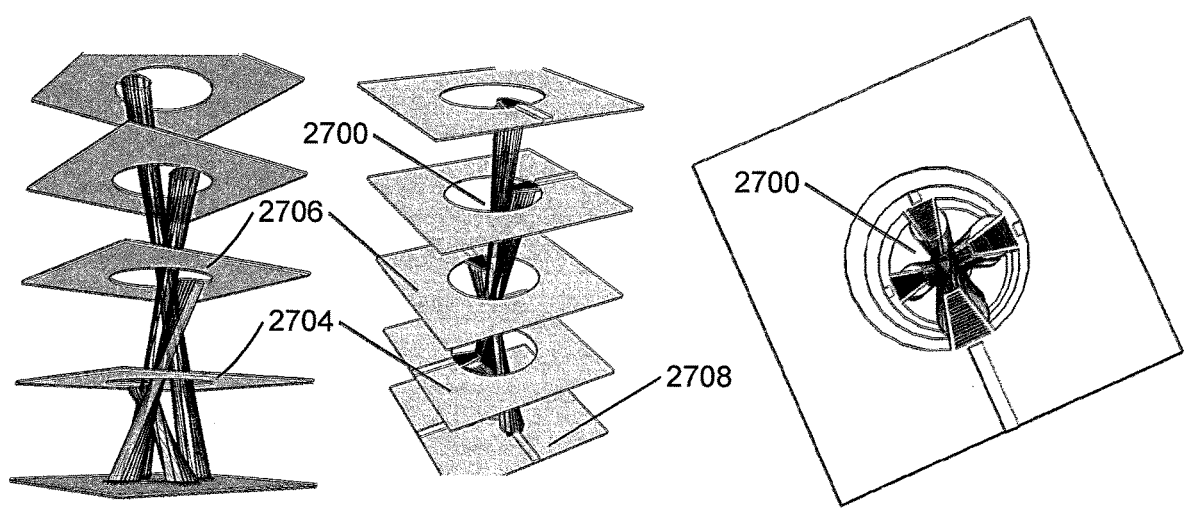
FIG. 27 is an illustration of a variation on the couplers and via of FIG. 26, where a chip of the system has multiple couplers each aimed at a coupler at a different level of the system.
Figure 28:
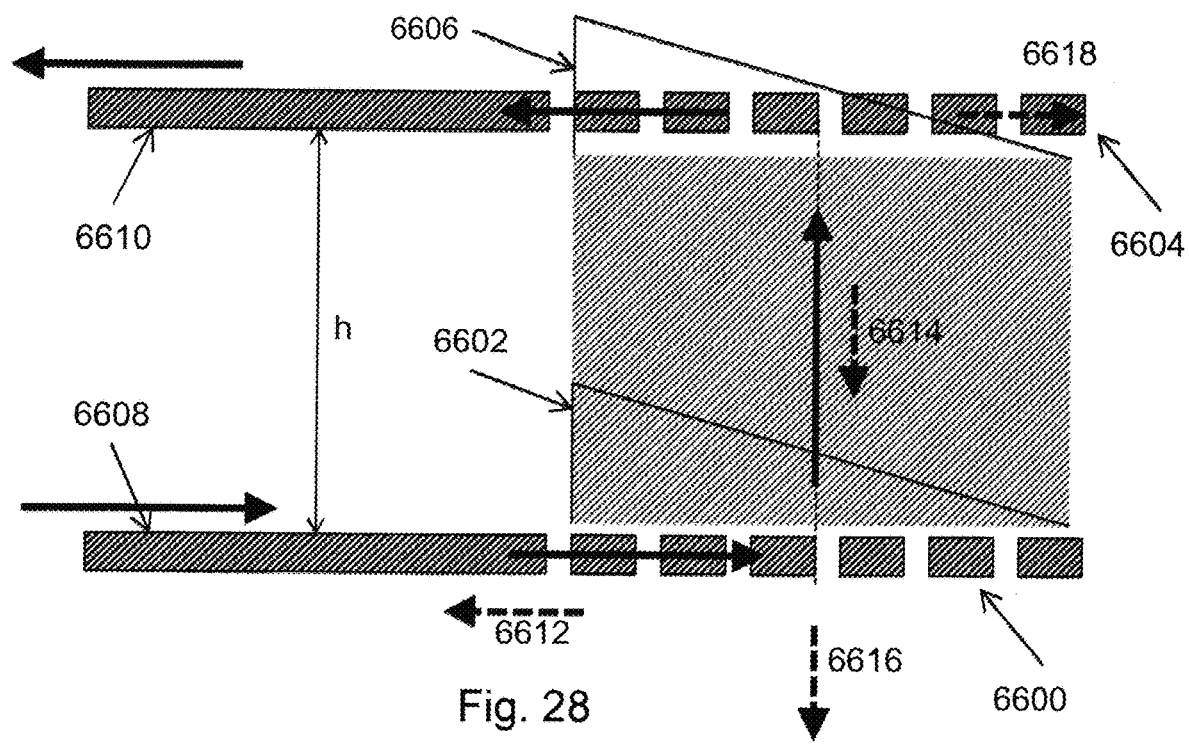
FIG. 28 is a cross sectional illustration of an embodiment with two symmetrical or bidirectional couplers on separate circuits, forming a light beam passing vertically between the circuits, such as may be used with either a Gaussian or exponential beam-power distribution.

Another exemplary grating coupler beam launcher/receiver geometry is shown in FIG. 27, where multi-level optical vias are provided. FIG. 27 shows a "carousel" geometry, where the beams may cross each other while connecting the bottom device layer to each of the first, second, third and fourth device layers above it. However, the grating coupler beam launcher/receiver optical antennas, and structures on intervening layers, must be placed so as to avoid obscuring or scattering light from any of the beams in the via hole. FIG. 27 illustrates communication of all device layers, such as layers 2704, 2706, to the bottom device layer 2708 using a single optical via hole 2702 through the substrates of all die, for clarity, only. Reuse of individual via holes in this situation also permits high density.

It should be noted that via holes herein described in some cases need not be drilled as holes because at some wavelengths the substrate may be transparent. At wavelength where the substrate is transparent, forming a via in a particular area is accomplished by ensuring that shapes that may be opaque, reflecting, or scattering on layers other than substrate are absent in an area that is referred to as a via hole filled by transparent substrate.

In another embodiment of the invention, illustrated in FIGS. 28 to 32, we disclose an approach to construct high coupling efficiency optical vias using uniform grating structures. As described in previous sections, a uniform grating 6600 may be simpler to fabricate and control the dimensions of than a non-uniform grating. However, a uniform grating may produce a substantially exponentially decaying launched field distribution 6602 along the grating 6600, which has a poor overlap with a Gaussian beam, or fundamental optical fiber mode (which is to a good approximation Gaussian)—a typical upper limit on coupling efficiency is about 80%. It may be noted, however, that an optical via need not synthesize a Gaussian beam. Specifically, if the sending grating coupler 6600 produces an exponential field distribution 6602 in the upward propagating beam (i.e. in its cross-section along one dimension, and Gaussian like in the other cross-sectional dimension), then a second grating coupler 6604 also designed to launch an exponential beam distribution 6606 may receive this exponential beam 6604 efficiently (i.e. in principle with 100% overlap efficiency). The grating couplers 6600 and 6602 may be oriented in the same direction, i.e. with their input waveguides 6608 and 6610 on the same side of the coupler (left side in FIG. 28) in order for the exponential field distributions 6602 and 6606 to have optimal overlap. Specifically, if the output waveguide 6610 of the output coupler 6604 were on the opposite side (as in many of the other embodiments, and as would typically be the case when identical couplers are used that launch angled, i.e. non-vertical, output beams), the two exponentials would be oriented in opposite directions and would thus have a poor overlap integral. The optical via embodiment in FIG. 28 has the two couplers configured to have their period such that a vertical beam is formed. This has the advantage that the two couplers are identical, but the disadvantage that there may be significant second-order grating induced reflection 6612 from the grating back into the input waveguide, as well as reflection 6614 to the via beam from the surface normal, both degrading performance of the optical via. Furthermore, if simple, single layer uniform grating couplers are used, there may not be ideal directionality in launching and receiving the beam, hence significant power may be lost through radiation downward 6616, or in the wrong output direction 6618, due to the symmetry of the system. A final drawback of this approach is that an exponential field distribution with a sharp starting edge at the start of the grating may change its shape as the field diffracts as the beam propagates up from the first to the second grating coupler. Hence, the proposed approach works best when the distance h is small enough that significant diffraction does not occur. For long distance optical vias, some of the focusing beam embodiments disclosed earlier herein offer better performance.

Figure 29:
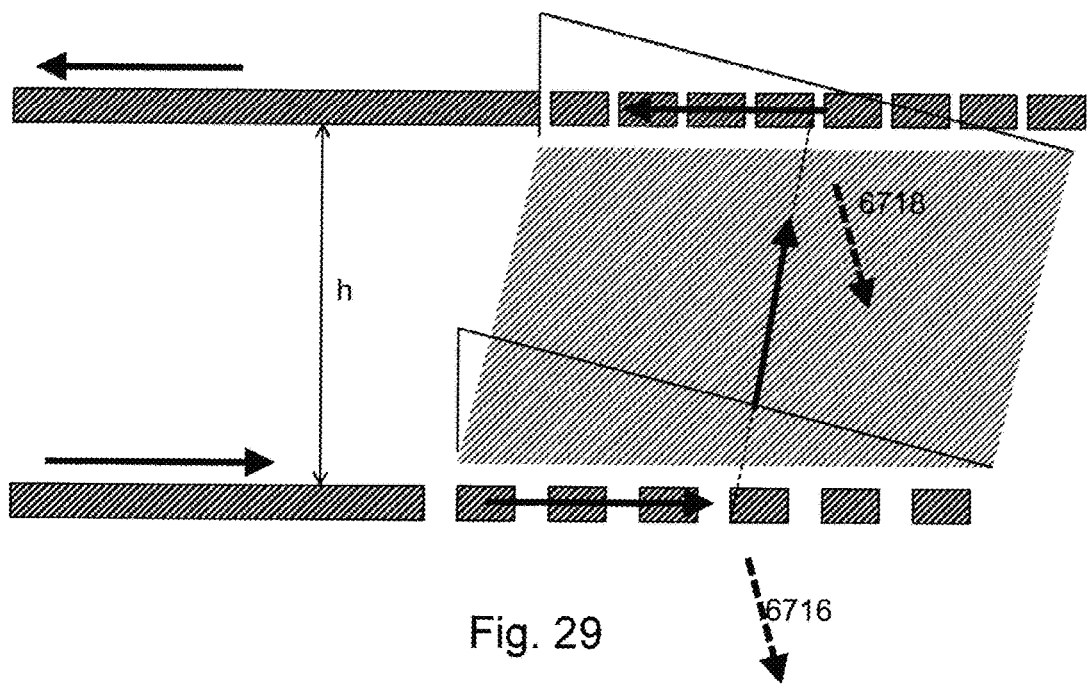
FIG. 29 is a cross sectional illustration of an embodiment with two bidirectional couplers on separate circuits, forming a light beam passing vertically between the circuits.

In another embodiment, shown in FIG. 29, the period of the first grating coupler is configured to support a beam angle $+\theta$ from the normal (i.e. forward angle), while the period of the second grating coupler is configured to support an equal in magnitude, but opposite in sign, beam angle $-\theta$ from the normal (i.e. a backward angle). Furthermore, the duty cycle of each grating may be designed so that, with the different periods, the field decay rate when launching a beam from either coupler is the same. In this situation, the overlap integral may still be 100%, yet due to the angled beams, the reflections back to the input waveguide may be eliminated. Because the grating couplers used in this example are not necessarily unidirectional, there is still transmission loss in the optical via from power radiated in the wrong direction 6616 and 6618. Another drawback of this design is that the sending and receiving couplers require different designs, and fabrication variations may have different impact on the two, hence this design may have some sensitivities to dimensional errors.

Figure 30:
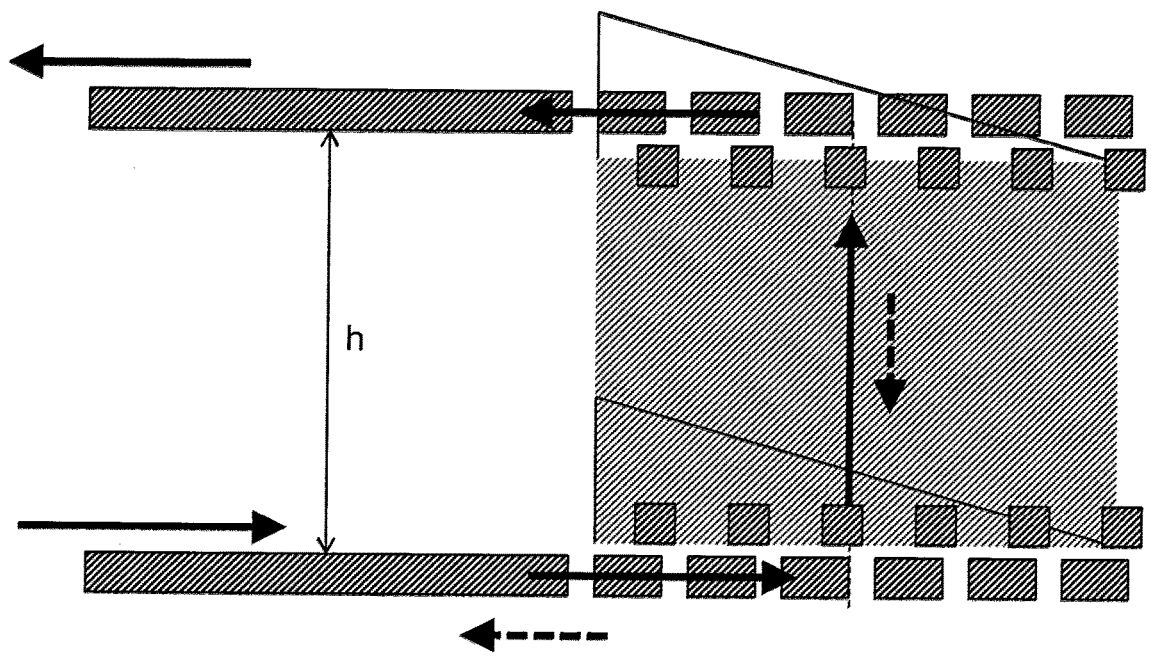
FIG. 30 is a cross sectional illustration of an embodiment with two unidirectional couplers on separate circuits, forming a light beam passing vertically between the circuits, such as may be used with either a Gaussian or exponential beam-power distribution.
Figure 31:
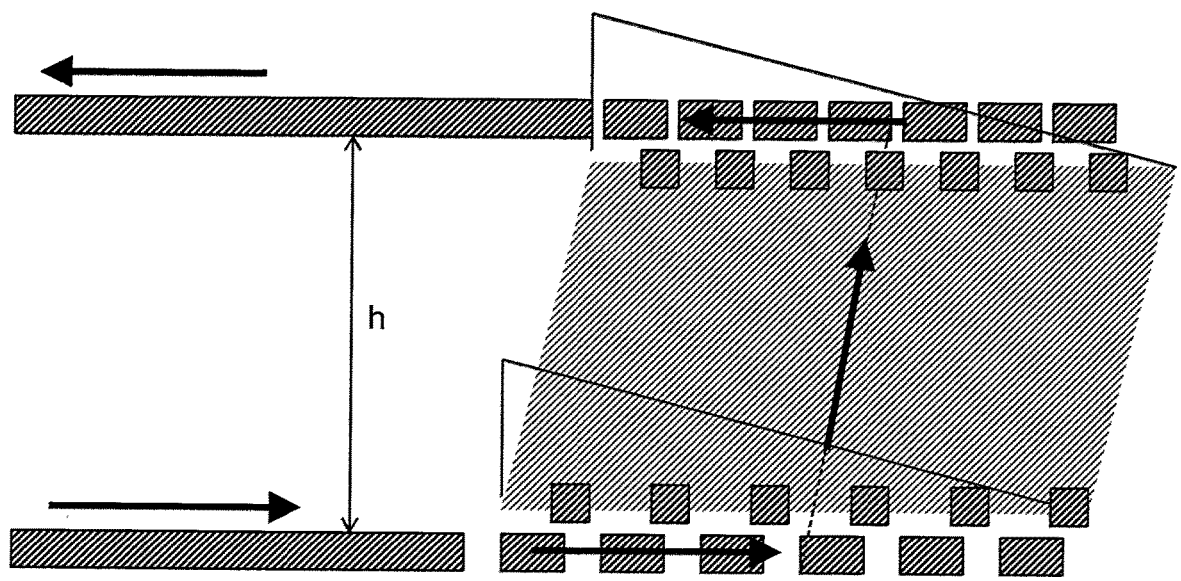
FIG. 31 is a cross sectional illustration of an embodiment with two unidirectional couplers on separate circuits, forming a light beam passing vertically between the circuits.

In yet other embodiments, shown in FIGS. 30 and 31, the vertical or angled exponential field (uniform coupler) vias may be realized using unidirectional grating designs based on multi-level, i.e. unidirectional radiating units. The fact that a uniform (i.e. periodic) structure may be employed means that these structures are easier to design, and may be more tolerant to fabrication errors than non-uniform (variable parameter) designs. If the scattering strengths are matched, and the angles are of equal magnitude and opposite sign in the two gratings, the design in FIG. 31 may in principle offer near 100% coupling efficiency, so long as the distance h between the couplers is small enough that effects of diffraction may be neglected.

In the other, transverse, dimension of each grating coupler, the field distribution may be Gaussian or nearly so, as it is in the fundamental mode of a standard waveguide. To counteract diffraction in this, transverse, dimension, the grating coupler structure may be slightly curved, with the edges of the coupler closer to the input waveguide than the middle, so that a flat phase front incident on the coupler from the waveguide has first the edges radiated up, and then the middle, thus creating a parabolic focusing phase front. The same rules with respect to optimal via size may be employed as already disclosed with respect to focusing optical vias earlier in the document.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An optical out-of-plane coupler on a monolithically integrated metal-oxide-semiconductor (MOS) integrated circuit comprising:
   a waveguide; and
   a grating coupled to the waveguide, the grating comprising a plurality of scattering units,
   each scattering unit further comprising:
      a first scattering element formed of a first shape formed in a polysilicon gate layer of the integrated circuit, and
      a second scattering element formed of a second shape formed in an active layer of the integrated circuit,
      each shape having width smaller than two microns,
      the polysilicon gate layer being also used to form gates of MOS transistors of the integrated circuit;
   the waveguide being formed in a layer comprising a layer selected from the group consisting of the polysilicon gate layer and the active layer;
   the first scattering element in each scattering unit having a first side (E1) disposed towards the waveguide and a second side (E2) disposed more distant from the waveguide than side E1;
   the second scattering element in each scattering unit having a first side (E3) disposed towards the waveguide and a second side (E4) disposed more distant from the waveguide than side E3;
   wherein sides E1 and E3 are offset along the in-plane propagation direction from the waveguide W to the grating;
   wherein sides E2 and E4 are offset along the in-plane propagation direction from the waveguide to the grating;
   wherein:
      if side E1 is closer to the waveguide than side E3, then side E2 is closer to the waveguide than side E4 and light will be scattered with constructive interference out-of-plane toward the second scattering elements,
      and if side E3 is closer to the waveguide than side E1, then side E4 is closer to the waveguide than side E2 and light will be scattered with constructive interference out-of-plane toward the first scattering elements; and
   wherein a distance from E1 to E3 is less than a design wavelength of light, the design wavelength being less than 1650 nanometers;
   and a distance measured in an axis perpendicular to a plane of the integrated circuit between the first and second scattering element being less than 500 nanometers.

2. The optical coupler of claim 1, the design wavelength of light being an infrared wavelength between 1100 and 1600 nanometers.

3. The optical coupler of claim 1 wherein the first scattering elements have nonuniform width and spacing and the second scattering elements have nonuniform width and spacing, the scattering elements having widths determined to produce a beam having a Gaussian intensity distribution.

4. An interlayer out-of-plane optical coupling system comprising:
   a first integrated circuit having a first coupler, the first coupler comprising:
      a first waveguide; and
      a first grating coupled to the first waveguide, the first grating comprising a plurality of scattering units, each scattering unit further comprising at least a first scattering element formed of:
         a shape in an active silicon layer of the first integrated circuit; and
         a shape in a polysilicon gate layer of the first integrated circuit, wherein:
         each of the shape in the active silicon layer and the shape in the polysilicon gate layer have a leading edge,
         in at least one scattering unit the leading edge of the shape in the active silicon layer being offset by at least 100 nm from the leading edge of the shape in the polysilicon gate layer,
         each of the shape in the active silicon layer and the shape in the polysilicon gate layer have a trailing edge,
         in at least one scattering unit the trailing edge of the shape in the active silicon layer being offset by at least 100 nm from the trailing edge of the shape in the polysilicon gate layer,
         if the leading edge of the shape in the polysilicon layer is closer to the waveguide than the leading edge of the shape in the active layer, then the trailing edge of the shape in the polysilicon layer is closer to the waveguide than the trailing edge of the shape in the active layer and light will be scattered with constructive interference out-of-plane toward the shape in the active layer, and
         if the leading edge of the shape in the active layer is closer to the waveguide than the leading edge of the shape in the polysilicon layer, then the trailing edge of the shape in the active layer is closer to the waveguide than the trailing edge of the shape in the polysilicon layer and light will be scattered with constructive interference out-of-plane toward the shape in the polysilicon layer; and
   a second integrated circuit having a second coupler, the second coupler comprising a second waveguide coupled to a second grating comprising a plurality of second scattering units, each second scattering unit further comprising at least a second scattering element,
   the first grating configured to divert light out-of-plane from the first waveguide primarily along a light path directed to the second optical coupler.

5. The system of claim 4 further comprising a via in a third integrated circuit, the third integrated circuit disposed between the first and second integrated circuit, the via comprising a hole, and wherein the light path passes through the via.

6. The system of claim 4 wherein the scattering units of the first coupler further comprise a third scattering element formed of a shape in a different layer than the first scattering element.

7. The system of claim 4 wherein the first coupler is configured with first scattering elements having non-uniform width along an in-plane propagation direction in the coupler, the scattering elements having a width distribution determined to focus light of the design wavelength.

8. The system of claim 4 wherein the light path is at least 2 degrees away from propagation direction at right angles relative to a surface of the first integrated circuit.

9. The system of claim 5 further comprising a third and a fourth optical coupler, the third optical coupler being configured to divert light from a third waveguide primarily along a second light path directed to the fourth optical coupler, and wherein the second light path passes through the via.

10. The optical coupler of claim 1 wherein the first and second scattering element are spaced in the plane of the chip by a distance between 100 nanometers (nm) and 2000 nm, and normal to the plane of the chip by between 25 nm to 500 nm.

11. An out-of-plane grating coupler comprising:
a waveguide coupled to a grating comprising a plurality of scattering units, at least a subset of the scattering units each further comprising:
  a first structure formed of a first core material layer having a first thickness, adjacent
  a second structure formed of a second core material layer having a second thickness;
  wherein the first and second core material layer are different material layers;
wherein:
  E1 is a first edge of the first structure other than top and bottom edges,
  E2 is a second edge of the first structure other than top or bottom edges,
  E3 is a first edge of the second structure other than top or bottom edges, and
  E4 is a second edge of the second structure other than top or bottom edges,
wherein edges E1 and E3 are offset, and edges E2 and E4 are offset along a direction of propagation in a plane of the first material layer from an edge of the waveguide toward the grating such that:
  E1 is closer to the waveguide than E3, and
  E2 is closer to the waveguide than E4,
  the offset from edge E1 to edge E3 is less than 2000 nanometers, and
  light will be scattered with constructive interference out-of-plane toward the second core material layer.

12. The grating coupler of claim 11 formed on a metal-oxide-semiconductor (MOS) integrated circuit, a layer selected from the first and second core material layers being selected from the group consisting of a layer used for gates of MOS transistors of the integrated circuit and an active body layer of the integrated circuit.

13. The grating coupler of claim 11, wherein the first and second core material layers are spaced in a direction normal to the plane of the chip by less than 500 nanometers.

14. An optical system comprising:
a first integrated circuit having a first out-of-plane coupler, the first out-of-plane coupler comprising:
  a first waveguide; and
  a first grating coupled to the first waveguide, the first grating comprising a plurality of scattering units;
a second out-of-plane coupler comprising:
  a second waveguide; and
  a second grating coupled to the second waveguide, the second grating comprising a plurality of second scattering units and located in a plane different from a plane of the first out-of-plane coupler;
wherein the first out-of-plane coupler is configured as a focusing coupler for producing a focused optical beam having a beam waist between the first out-of-plane coupler and the second out-of-plane coupler, the second out-of-plane coupler being aligned to receive the focused optical beam produced by the first out-of-plane coupler; and wherein the scattering units of the first out-of-plane coupler comprise a first portion of silicon and gap, the first portion of silicon having a first thickness and formed on a first layer of silicon, adjacent a second portion of silicon and gap, the second portion of silicon having a second thickness and formed on a second layer of silicon, the first waveguide comprising a silicon structure formed on the first or second layer of silicon, there being an offset of 100 nm to 2000 nm in a plane of the waveguide between the first portion of silicon and the second portion of silicon such that light will be scattered with constructive interference out-of-plane toward whichever of the first portion of silicon and the second portion of silicon is farther from the waveguide;
wherein, when viewed from a point perpendicular to a plane of the coupler, the first portion of silicon having a first section overlapping the corresponding second portion of silicon, and a second section not overlapping the corresponding second portion of silicon; and
wherein the second portion of silicon has a first section overlapping the first portion of silicon, and a second section portion not overlapping the first portion of silicon.

15. The system in claim 14, further comprising a third integrated circuit having an optical via, wherein the focused optical beam is further configured to pass through the optical via, the via being disposed between the first and the second coupler.

16. The system of claim 15 where a cross-sectional area of the beam waist is between four plus the square root of fifteen and one divided by the quantity four plus the square root of fifteen, times half a product of a distance between the first and second circuits and the wavelength.

17. A planar, unidirectional out-of-plane optical coupler on a chip, for coupling light at an operating wavelength, the planar, unidirectional out-of-plane optical coupler on a chip comprising:
a first grating comprising an array of lithographically defined elements in a first material layer;
a second grating comprising an array of lithographically defined elements in a second planar material layer different from the first material layer; and
a waveguide;
wherein:
  the waveguide comprises a portion of a lithographically patterned material layer selected from the first and second planar material layers;
  the first grating being displaced from the second grating in a direction normal to the plane of the first planar material layer by a distance that is between 25 nm and 500 nm such that light will be scattered with constructive interference out-of-plane toward whichever of the first grating and the second grating is farther from the waveguide;
  the lithographically defined elements forming the first grating are spaced in the plane of the first planar material by a distance of between 100 nm and 2000 nm; and
  the lithographically defined elements forming the second grating being spaced in the plane of the second planar material by a distance between 100 nm and 2000 nm;
wherein, when viewed from a point perpendicular to a plane of the coupler, a lithographically defined element of the second grating has a first portion overlapping a corresponding lithographically defined element of the first grating, and a second portion not overlapping the corresponding lithographically defined element of the first grating; and
wherein the corresponding lithographically defined element of the first grating has a third portion overlapping the lithographically defined element of the second grating, and a fourth portion not overlapping the corresponding lithographically defined element of the second grating.

18. The coupler in claim 17, where the first planar material layer is between 20 and 250 nm thick.

19. The coupler in claim 17, where the first planar material layer is a polysilicon gate layer of a complementary metal oxide semiconductor (CMOS) transistor material stack.

20. The coupler in claim 17, where the second planar material layer is an active body silicon layer of a complementary metal oxide semiconductor, silicon-on-insulator (CMOS SOI) transistor material stack.

21. The optical coupler of claim 3, wherein:
at positions along the grating (in the propagation direction) where the width of first scattering elements increases from one element to the next in the propagation direction, the width of the second scattering elements increases from one element to the next; and
at positions along the grating (in the propagation direction) where the width of first scattering elements decreases from one element to the next in the propagation direction, the width of the second scattering elements decreases from one element to the next.

22. The optical coupler of claim 1 wherein:
The first and second scattering elements of each scatterer overlap in part, with at least part of a gap on the active layer lying under first shape.

23. The grating coupler of claim 11, wherein the first and second core material layers are selected from the group consisting of semiconductors including silicon, gallium arsenide, germanium, silicon carbide, diamond, and dielectrics including silicon nitride, silicon oxynitride (SiOxNy), silicon oxycarbides (SiCOH), and chalcogenide glasses.

* * * * *